(12) United States Patent
Liu et al.

(10) Patent No.: US 12,556,144 B2
(45) Date of Patent: Feb. 17, 2026

(54) PREDISTORTION METHOD AND SYSTEM, DEVICE, AND STORAGE MEDIUM

(71) Applicant: ZTE CORPORATION, Shenzhen (CN)

(72) Inventors: Lei Liu, Shenzhen (CN); Guanghui Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 692 days.

(21) Appl. No.: 17/788,042

(22) PCT Filed: May 11, 2021

(86) PCT No.: PCT/CN2021/093060
§ 371 (c)(1),
(2) Date: Jun. 22, 2022

(87) PCT Pub. No.: WO2021/244236
PCT Pub. Date: Dec. 9, 2021

(65) Prior Publication Data
US 2023/0033203 A1 Feb. 2, 2023

(30) Foreign Application Priority Data

Jun. 2, 2020 (CN) .......................... 202010491525.5

(51) Int. Cl.
*H03F 1/32* (2006.01)
*H03F 1/30* (2006.01)
*H03F 3/195* (2006.01)

(52) U.S. Cl.
CPC ............. *H03F 1/3247* (2013.01); *H03F 1/30* (2013.01); *H03F 1/3258* (2013.01); *H03F 3/195* (2013.01)

(58) Field of Classification Search
CPC ........ H03F 1/3247; H03F 1/30; H03F 1/3258; H03F 3/195; H03F 2200/451; H03F 3/245; G06N 3/048; G06N 3/0464; G06N 3/084
(Continued)

(56) References Cited

U.S. PATENT DOCUMENTS 7,583,754 B2 * 9/2009 Liu .................. H03F 1/3258
375/295
2002/0186783 A1 12/2002 Opas et al.
(Continued)

FOREIGN PATENT DOCUMENTS

CN 1335699 A 2/2002
CN 101072220 A 11/2007
(Continued)

OTHER PUBLICATIONS

Eun, C., et al. "Utilization of Neural Network Signal Processing in the Design of a Predistorter for a Nonlinear Telecommunication Channel," Proceedings of IEEE International Conference on Neural Networks, 1994, pp. 3582-3586.
Japan Patent Office. Notice of Reasons for Refusal for JP Application No. 2022-25119 and English translation, mailed Sep. 5, 2020, pp. 1-6.
European Patent Office. Extended European Search Report for EP Application No. 21818081.8, mailed Jun. 13, 2024, pp. 1-21.
(Continued)

*Primary Examiner* — Andrea Lindgren Baltzell
*Assistant Examiner* — Khiem D Nguyen
(74) *Attorney, Agent, or Firm* — Vivacqua Crane, PLLC

(57) ABSTRACT

Disclosed are a predistortion method and system, a device, and a non-transitory computer-readable storage medium. The predistortion method is applicable to a predistortion system which may include a predistortion multiplier, a complex neural network, and a radio frequency power amplifier output feedback circuit. The method may include: inputting a training complex vector to the predistortion system to obtain a complex scalar corresponding to the training complex vector, which is output by the predistortion
(Continued)

system; training the predistortion system based on the training complex vector and the complex scalar until a generalization error vector magnitude and a generalization adjacent channel leakage ratio corresponding to the predistortion system meet set requirements; and inputting a service complex vector to the trained predistortion system to obtain a predistortion corrected complex scalar.

18 Claims, 5 Drawing Sheets

(58) Field of Classification Search
USPC .......................................................... 330/149
See application file for complete search history.

(56) References Cited

U.S. PATENT DOCUMENTS

| | | | |
|---|---|---|---|
| 2006/0240786 | A1 | 10/2006 | Liu |
| 2012/0263117 | A1* | 10/2012 | Love ............... H04W 72/23 370/328 |
| 2014/0294119 | A1 | 10/2014 | Sochacki |
| 2017/0317913 | A1 | 11/2017 | Kim et al. |
| 2017/0338841 | A1 | 11/2017 | Pratt |

FOREIGN PATENT DOCUMENTS

| | | |
|---|---|---|
| CN | 105207716 A | 12/2015 |
| CN | 109302156 A | 2/2019 |
| CN | 110765720 A | 2/2020 |
| CN | 111900937 A | 11/2020 |
| JP | 2003078454 A | 3/2003 |
| KR | 100695632 B1 | 3/2007 |

OTHER PUBLICATIONS

Hu, X., et al. "Convolutional Neural Network for Behavioral Modeling and Predistortion of Wideband Power Amplifiers," IEEE Transactions on Neural Networks and Learning System, vol. 33, No. 8, Aug. 2022, pp. 3923-3937.

Intellectual Property India. Hearing Notice and Objections in Reference of Application No. for IN Application No. 202227035806 and English translation, mailed Apr. 24, 2024, pp. 1-3.

Korean Intellectual Property Office. Office Action for KR Application No. 10-2022-7021174 and English translation, mailed Jun. 24, 2024, pp. 1-10.

Stulp, F., et al. "Many Regression Algorithms, One Unified Model: A Review," Neural Networks, vol. 69, 2015, pp. 60-79.

Yu, Z. "A Generalized Digital Predistortion Model Based on Artificial Neural Networks," IEEE 2018 Asia-Pacific Microwave Conference (APMC), pp. 935-937.

Yu, Z., et al. "A Generalized Model Based on Canonical Piecewise Linear Functions for Digital Predistortion," IEEE 2016 Asia-Pacific Microwave Conference (APMC), pp. 1-4.

International Searching Authority. International Search Report and Written Opinion for PCT Application No. PCT/CN2021/093060 and English translation, mailed Jul. 12, 2021, pp. 1-10.

The State Intellectual Property Office of People's Republic of China. First Office Action and Search Report for CN Application No. 202010491525.5 and English translation, mailed Jul. 26, 2025, pp. 1-13.

Wu, L., et al. "HPA Predistortion Algorithm Based on Adaptive Extended Kalman Filter and Neural Network," Acta Automatica Sinica, vol. 42, No. 1, Jan. 2016, pp. 122-130.

* cited by examiner

PREDISTORTION METHOD AND SYSTEM, DEVICE, AND STORAGE MEDIUM

CROSS-REFERENCE TO RELATED APPLICATION

This application is a national stage filing under 35 U.S.C. § 371 of international application number PCT/CN2021/093060, filed May 11, 2021, which claims priority to Chinese patent application No. 202010491525.5, filed on Jun. 2, 2020. The contents of the international application are incorporated herein by reference in their entirety.

TECHNICAL FIELD

The present disclosure relates to the technical field of communications, in particular, to a predistortion method and system, a device and a non-transitory computer-readable storage medium.

BACKGROUND

Power amplifiers are key components in relation to energy consumption and signal quality. Power amplifier models and predistortion models have become key technologies for efficient communication and high data rate communication.

The ideal predistortion models and power amplifier models are mathematically strictly reciprocal in terms of their nonlinear characteristics, and both the predistortion models and the power amplifier models are related to typical nonlinear fitting problems. However, the conventional predistortion models and power amplifier models are inherently deficient in the nonlinear representation capability.

SUMMARY

The present disclosure provides a predistortion method and system, a device and a non-transitory computer-readable storage medium which solve the problem of the conventional predistortion models and power amplifier models being inherently deficient in the nonlinear representation capability, as well as the problem of poor predistortion correction due to the lagging response to the dynamic changes of the power amplifier system caused by the use of separated processing when applying neural networks.

An embodiment of the present disclosure provides a predistortion method applicable to a predistortion system which includes a predistortion multiplier, a complex neural network, and a radio frequency power amplifier output feedback circuit, the method may include: inputting a training complex vector to the predistortion system to obtain a complex scalar corresponding to the training complex vector, which is output by the predistortion system; training the predistortion system based on the training complex vector and the complex scalar until a generalization error vector magnitude and a generalization adjacent channel leakage ratio corresponding to the predistortion system meet set requirements; and inputting a service complex vector to the trained predistortion system to obtain a predistortion corrected complex scalar.

A further embodiment of the present disclosure provides a predistortion system which performs the predistortion method provided by an embodiment of the present disclosure, the predistortion system may include: a predistortion multiplier, a complex neural network, and a radio frequency power amplifier output feedback circuit, wherein a first input end of the predistortion multiplier is an input end of the predistortion system and is connected to a first input end and a second input end of the complex neural network, an output end of the predistortion multiplier is connected to an input end of the radio frequency power amplifier output feedback circuit, an output end of the radio frequency power amplifier output feedback circuit is an output end of the predistortion system, and the output end of the radio frequency power amplifier output feedback circuit is connected to the second input end of the complex neural network; and an output end of the complex neural network is connected to a second input end of the predistortion multiplier.

A further embodiment of the present disclosure provides a predistortion system which performs the predistortion method provided by an embodiment of the present disclosure, the predistortion system may include: a predistortion multiplier, a complex neural network, a radio frequency power amplifier output feedback circuit, a first real-time power normalization unit, and a second real-time power normalization unit, wherein an input end of the first real-time power normalization unit is an input end of the predistortion system, an output end of the first real-time power normalization unit is connected to a first input end of the predistortion multiplier, a first input end of the complex neural network, and a second input end of the complex neural network, an output end of the predistortion multiplier is connected to an input end of the radio frequency power amplifier output feedback circuit, an output end of the radio frequency power amplifier output feedback circuit is an output end of the predistortion system, the output end of the radio frequency power amplifier output feedback circuit is connected to an input end of the second real-time power normalization unit, an output end of the second real-time power normalization unit is connected to the second input end of the complex neural network, and an output end of the complex neural network is connected to a second input end of the predistortion multiplier.

A further embodiment of the present disclosure provides a device, which may include: at least one processor; and a storage apparatus, configured to store at least one program, where the at least one program, when executed by the at least one processor, causes the at least one processor to implement the predistortion method described above.

A further embodiment of the present disclosure provides a non-transitory computer-readable storage medium storing a computer program which, when executed by a processor, causes the processor to implement the predistortion method described above.

DETAILED DESCRIPTION

The embodiments of the present disclosure will be described below with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order from the order shown or described herein.

Figure 1:
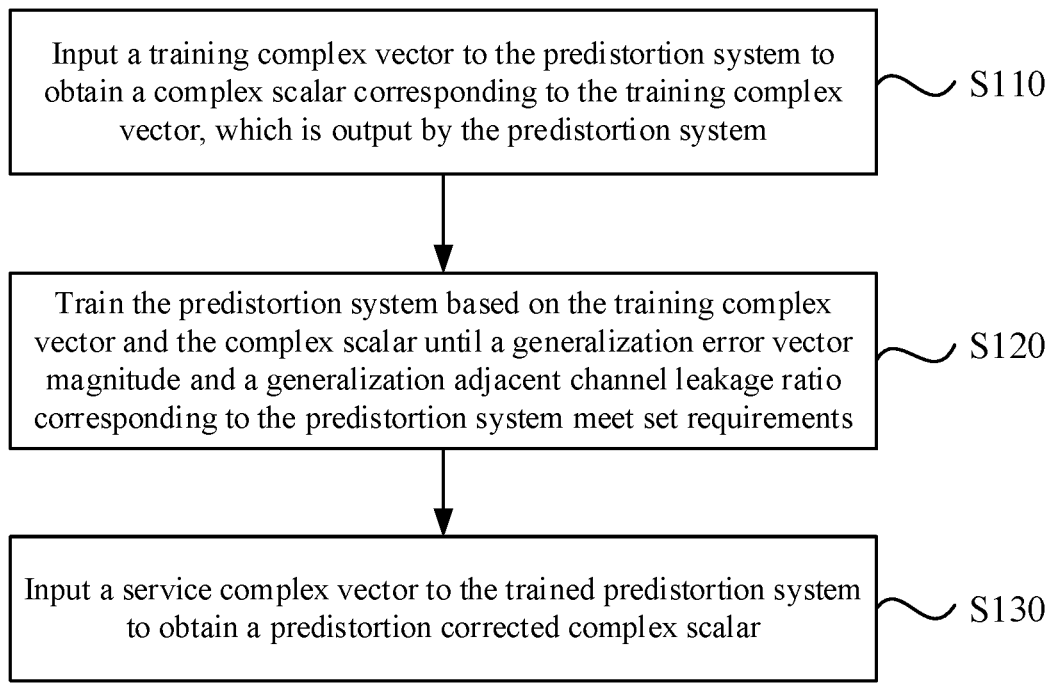
FIG. 1 is a flowchart of a predistortion method provided by an embodiment of the present disclosure.

In an illustrative implementation, FIG. 1 is a flowchart of a predistortion method provided in an embodiment of the present disclosure, where this method may be applicable to the scenario of predistortion processing, and may be performed by a predistortion system which may be implemented by software and/or hardware and integrated in a terminal device.

A power amplifier (PA) usually has the following three characteristics: 1) the static nonlinearity of the device itself (i.e., Static (Device) Nonlinearity); 2) the linear memory effect originating from the delay of the matching network and the device components; and (3) the nonlinear memory effect originating mainly from the trapping effect of transistors and the non-ideal characteristics of bias networks, as well as the dependence of the input level on temperature changes.

A predistorter (PD) module is located before the radio frequency power amplifier and is configured to perform inverse processing in advance on the nonlinear distortion generated when the signal passes through the power amplifier, where the predistortion implemented in the digital domain is called digital predistortion (digital PD, DPD).

Therefore, the ideal predistortion and the nonlinear characteristics of power amplifiers are mathematically strictly reciprocal, both of which are related to typical nonlinear fitting problems. However, the conventional series or polynomial models for fitting the nonlinear characteristics of power amplifiers has the problem of being inherently deficient in the capability of representing or fitting complex nonlinearities. Hereinafter, a memory polynomial power amplifier model will be illustrated as an example, where the mathematical expression of the model is as follows:

$$y(n) = \sum_{p=1, m=0}^{P,M} C_{p,m} \cdot [x(n-m) \cdot |x(n-m)|^{p-1}]$$

Figure 2:
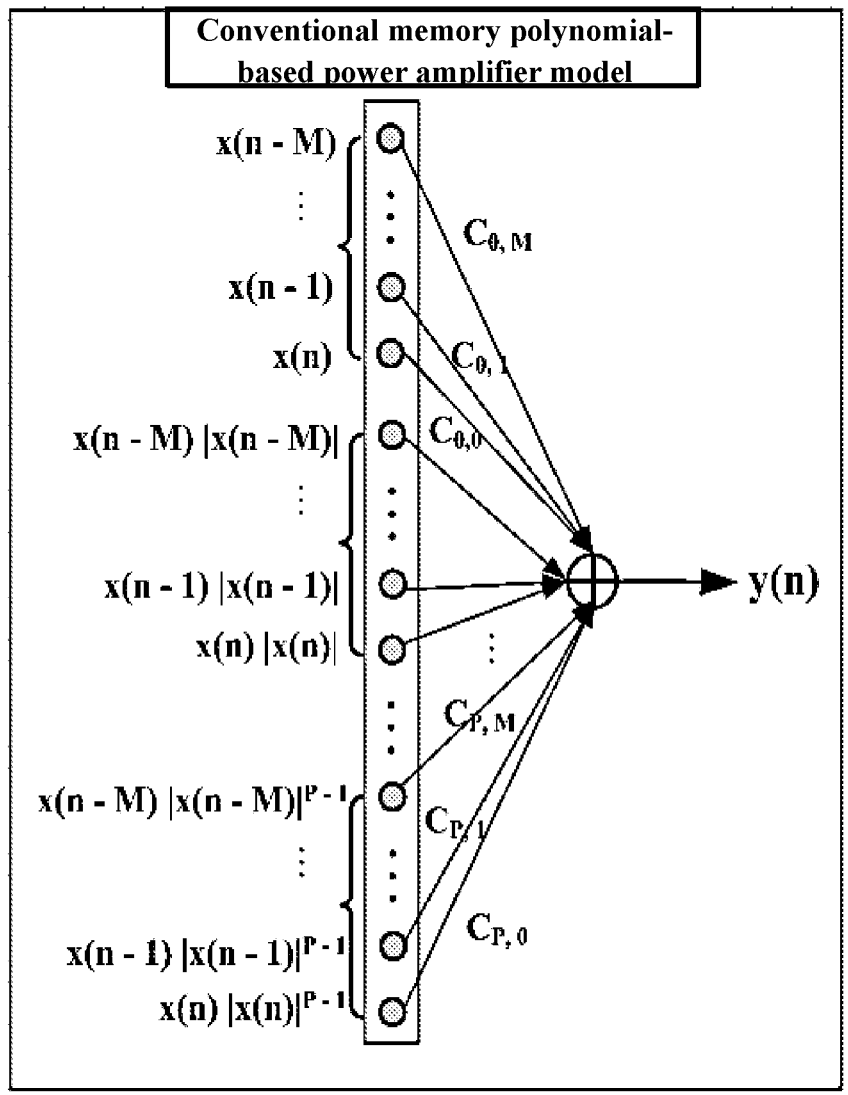
FIG. 2 is a schematic diagram of a conventional memory polynomial-based power amplifier model.

FIG. 2 illustrates a schematic diagram of a conventional memory polynomial-based power amplifier model, which is equivalent to a zero-hidden layer network having only input layers and output layers, not even a multi-layer perceptron (MLP) network. However, it is well known in the field that the expression capability of a network is positively related to its structural complexity, which is the fundamental reason for the inherent deficiency of nonlinear expression capability of the conventional power amplifier models. However, the aforementioned predistortion and the nonlinearity of power amplifiers are inverse functions of each other, so it can be expected that the same bottleneck will inevitably exist when using conventional series or polynomial models to model DPDs.

The conventional power amplifier model is usually truncated or simplified in various ways, which makes the depiction of the real nonlinear characteristics of the power amplifier more inadequate. This also leads to the problem that the output obtained by using the parameters derived with the model deviates significantly from the expected output when new data or inputs are encountered, i.e., the model does not have the universality and generalization capability for new data, while the generalization capability is the most important indicator for performance test of neural networks. At the same time, neural networks have abundant structural forms and their nonlinear representation or fitting capability has long been widely verified by academia and industry.

Nevertheless, various methods and techniques using neural networks for predistortion have adopted a way in which the two phases of learning and predistortion processing of the nonlinear characteristics of the power amplifier are separated from each other, that is: in the first step, the neural network is not connected to the main link for signal processing, i.e., it does not perform predistortion processing of signals, but only receives the feedback output of the power amplifier to train or learn the nonlinear characteristics of the power amplifier or its inverse characteristics; and after the learning of the nonlinear characteristics is completed, the neural network is connected to the main link, or the weights obtained through its training are delivered to a complex neural network on the main link, and then the predistortion processing starts.

This separated processing will inevitably cause the problem of lagging response or learning mismatch of the neural network to the dynamic changes of the power amplifier system, that is, the weights of the neural network trained before the moment of connection to the system reflect only the previous dynamic characteristics of the system, while the adaptability to the system dynamics at the current moment is uncertain or unguaranteed, which leads to poor predistortion correction effects.

The present disclosure provides a predistortion method applicable to a predistortion system which includes a predistortion multiplier, a complex neural network, and a radio frequency power amplifier output feedback circuit. As shown in FIG. 1, the method includes the following steps:

At S110, a training complex vector is input to the predistortion system to obtain a complex scalar corresponding to the training complex vector, which is output by the predistortion system.

In the present disclosure, predistortion correction is performed based on a predistortion system. Here, the predistortion system may be considered to be a system capable of implementing predistortion correction. It includes a power amplifier and can integrate learning of nonlinear characteristics of the power amplifier with predistortion correction. That is, the predistortion system is directly connected to the power amplifier during training, and the learning of the nonlinear characteristics of the power amplifier is performed while predistortion correction is performed, thereby improving efficiency and accuracy. The predistortion system further includes a predistortion multiplier and a complex neural network. The complex neural network may provide a complex coefficient for multiplication by the predistortion multiplier. The predistortion multiplier may be considered as a multiplier which implements the predistortion function.

In an embodiment, the predistortion system may further include a first real-time power normalization unit and a second real-time power normalization unit. Here, "first" and "second" are only used to distinguish the real-time power normalization units. The real-time power normalization units may perform normalization processing. For example, the first real-time power normalization unit may normalize a training complex vector and then input the normalized training complex vector to the predistortion multiplier and the complex neural network of the predistortion system. The second real-time power normalization unit may normalize a complex scalar corresponding to the training complex vector and return the normalized complex scalar to the complex neural network of the predistortion system.

The training complex vector may be considered as a complex vector for use in training the predistortion system. In this step, the training complex vector may be input to the predistortion system to obtain the complex scalar which is output by the predistortion system, where the complex scalar may be output by a radio frequency power amplifier output feedback circuit in the predistortion system. The complex scalar and the training complex vector may be used as samples for training the predistortion system, where the predistortion system may be trained based on the complex scalar and the nonlinear characteristics of the power amplifier may be learned during the training process.

At S120, the predistortion system is trained based on the training complex vector and the complex scalar until a generalization error vector magnitude and a generalization adjacent channel leakage ratio corresponding to the predistortion system meet set requirements.

In the present disclosure, the training complex vector and the complex scalar may be input to the predistortion system in order to train the predistortion system. This training may be supervised training. A weight parameter and a bias parameter of each layer of the complex neural network may be updated through a loss function of the complex neural network.

The condition for ending the training of the predistortion system may be determined based on the generalization error vector magnitude and the generalization adjacent channel leakage ratio. The training of the predistortion system may be considered complete if the generalization error vector magnitude and the generalization adjacent channel leakage ratio meet the set requirements. The set requirements may be set according to the actual requirements and are not limited herein, for example, the set requirements may be determined based on the predistortion indicators.

In an embodiment, the training of the predistortion system is completed in response to values corresponding to the generalization error vector magnitude and the generalization adjacent channel leakage ratio being greater than or equal to their respective set thresholds, and the training of the predistortion system is continued in response to the values corresponding to the generalization error vector magnitude and the generalization adjacent channel leakage ratio being less than their respective set thresholds.

The set thresholds may be set according to the actual requirements and are not limited herein. In the case where the generalization error vector magnitude and the generalization adjacent channel leakage ratio do not meet the set requirements, this training complex vector may be used to continue the training of the predistortion system.

In the present disclosure, by taking the condition that both the generalization error vector magnitude and the generalization adjacent channel leakage ratio meet the set requirements as the condition for ending the training of the predistortion system, the universality and generalization capability of the predistortion system for predistortion correction can be measured and reflected. The generalization capability refers to a capability by which, after repeatedly inputting complex vectors from a training set to the predistortion system so that such training is essentially learning of known data by the system, the parameters of that predistortion system are solidified, and then data from an entirely new test set unknown to the system are input to count and examine the adaption or predistortion of the system with respect to a wider range of new inputs or new data.

At S130, a service complex vector is input to the trained predistortion system to obtain a predistortion corrected complex scalar.

After the training of the predistortion system is completed, a service complex vector may be input to the trained predistortion system to obtain a predistortion corrected complex scalar. Here, the service complex vector may be a service vector in the process of applying the predistortion system, where the vector is a complex vector.

The present disclosure provides a predistortion method applicable to a predistortion system which includes a predistortion multiplier, a complex neural network, and a radio frequency power amplifier output feedback circuit. The method includes: first inputting a training complex vector to the predistortion system to obtain a complex scalar corresponding to the training complex vector, which is output by the predistortion system; then training the predistortion system based on the training complex vector and the complex scalar until a generalization error vector magnitude and a generalization adjacent channel leakage ratio corresponding to the predistortion system meet set requirements; and finally inputting a service complex vector to the trained predistortion system to obtain a predistortion corrected complex scalar. In the present disclosure, the predistortion model in the related technology is replaced with a predistortion system. Since the complex neural network in this predistortion system has abundant structural forms as well as strong nonlinear representation or fitting capability, it can effectively solve the problem of inherent deficiency in the nonlinear representation capability of the conventional predistortion models and power amplifiers.

On the basis of the foregoing embodiment, a modified embodiment of the foregoing embodiment is proposed. For simplified description, only differences from the foregoing embodiment are described in the modified embodiment.

In an embodiment, the predistortion system is trained using a complex error back propagation algorithm.

The complex error back propagation algorithm may be considered as an error back propagation algorithm for complex numbers. The learning process of the error back propagation algorithm consists of two processes: forward propagation of signals and back propagation of errors.

In an embodiment, the predistortion system is trained, including:

initializing a system parameter of the predistortion system; training, based on a training set and the complex scalar, the predistortion system; testing the trained predistortion system based on a test set to obtain a generalization error vector magnitude and a generalization adjacent channel leakage ratio corresponding to the predistortion system; and completing training of the predistortion system in response to values corresponding to the generalization error vector magnitude and the generalization adjacent channel leakage ratio being greater than or equal to their respective set thresholds, and continuing the training of the predistortion system based on the training set in response to the values corresponding to the generalization error vector magnitude and the generalization adjacent channel leakage ratio being less than their respective set thresholds, where the training set and the test set are obtained based on splitting of a normalized complex vector, the normalized complex vector being an output of a first real-time power normalization unit included in the predistortion system which is obtained by inputting the training complex vector to the first real-time power normalization unit; or the training set and the test set are obtained based on splitting of the training complex vector.

The system parameter may be considered as a parameter required for initialization of the predistortion system and the content of the system parameter is not limited herein and may be set according to the actual situation. As an example, the system parameter includes, but is not limited to: a nonlinear order parameter, a power amplifier memory effect parameter, and an initial output of the complex neural network included in the predistortion system.

The initialization of the system parameter may be considered as setting the system parameter, and the set value may be an empirical value or determined based on history system parameters.

The training set may be considered as the set of complex vectors for training the predistortion system. The test set may be considered as the set of complex vectors for testing the generalization performance of the predistortion system. The complex vectors included in the training set are different from those included in the test set, and the union of the two are training complex vectors.

The complex vector which is input to the predistortion system in a partial interception manner from the training set each time is in one-to-one correspondence with the complex scalar correspondingly output from the predistortion system; and when training the predistortion system, it is based on the current element in the complex vector as well as the complex scalar that the loss function of the complex neural network in the predistortion system is calculated, and then the weight parameter and the bias parameter of each layer in the complex neural network are updated based on this loss function.

The complex vector which is input to the predistortion system in a partial interception manner from the test set each time is also in one-to-one correspondence with the complex scalar correspondingly output from the predistortion system; and when examining the generalization performance of the predistortion system, it is based on the entire test set and an output set consisting of all the complex scalars that the generalization error vector magnitude (GEVM) and generalization adjacent channel leakage ratio (GACLR) performance are statistically obtained, which are then used to determine whether to end the training of the predistortion system.

In an embodiment, elements in the normalized complex vector are determined through calculation expressions as follows:

$$x_1(n) = \frac{x_{1,raw}(n)}{\sqrt{\overline{P}_{x_1}(n)}}; \text{ and } \overline{P}_{x_1}(n) = \frac{1}{n}\sum_{d=1}^{n}|x_{1,raw}(d)|^2,$$

where $x_1(n)$ denotes an nth element in the normalized complex vector, $x_{1,raw}(n)$ denotes an nth element in the training complex vector, and $x_{1,raw}(d)$ denotes a dth element in the training complex vector.

In an embodiment, initializing a system parameter of the predistortion system comprises:

completing initialization of each layer in the complex neural network according to a layer type corresponding to the respective layer.

Initializing a system parameter of the predistortion system further includes: setting a nonlinear order parameter, a power amplifier memory effect parameter, and an initial output of the complex neural network included in the predistortion system. The set power amplifier memory effect parameter is not a limit to the power amplifier. The set nonlinear order parameter and power amplifier memory effect parameter are only used for the training of the predistortion system.

There is no limitation on the values of the nonlinear order parameter, the power amplifier memory effect parameter, and the initial output of the complex neural network included in the predistortion system; and there is no limitation on the execution order of the operation of setting the nonlinear order parameter, the power amplifier memory effect parameter, and the initial output of the complex neural network included in the predistortion system and the operation of initializing each layer of the complex neural network.

The initialization of each layer of the complex neural network may be performed based on corresponding initialization setting parameters, and there is no limitation on the initialization setting parameters, for example, the initialization setting parameters may be a distribution type and a distribution parameter.

In an embodiment, completing initialization of each layer in the complex neural network according to a layer type corresponding to the each layer includes:

initializing a weight parameter and a bias parameter of each layer in the complex neural network according to a distribution type and a distribution parameter of the respective layer.

As an example, in response to the current (to-be-initialized) layer being a full-connected layer, the weight parameter and the bias parameter of the layer are initialized according to the randomly initialized distribution type (e.g., Gaussian distribution, uniform distribution, etc.) and distribution parameter (the mean value, the variance, the standard deviation, etc.) which are set for that layer.

In an embodiment, training, based on a training set and the complex scalar, the predistortion system includes:

inputting complex vectors in the training set to the predistortion system in accordance with element indexes, where a size of a complex vector which is input each time is determined based on a power amplifier memory effect parameter, and a complex vector which is input to the predistortion system each time is obtained by combining a history element and a current element in the training set; inputting an output of the radio frequency power amplifier output feedback circuit in the predistortion system to the complex neural network after passing it through a second real-time power normalization unit included in the predistortion system; or inputting an output of the radio frequency power amplifier output feedback circuit in the predistortion system directly to the complex neural network; determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network; and updating, according to the determined partial derivatives or sensitivities for each layer, the weight parameter and the bias parameter of the respective layer, where an expression of a complex vector which is input to the predistortion system each time is as follows:

$$\vec{X}_1^{Train}=[x_1^{Train}(n-M_1), \ldots ,x_1^{Train}(n-m), \ldots ,x_1^{Train}(n-1),x_1^{Train}(n)],$$

where $\vec{X}_1^{Train}$ is the complex vector which is input to the predistortion system each time, $M_1$ is the power amplifier memory effect parameter, $0 \leq M_1 \leq TrainSize$, TrainSize is a size of the training set, $x_1^{Train}(n)$ is an nth element in the training set, $x_1^{Train}(n)$ is a current element, m is an integer greater than 1 and less than $M_1$, $x_1^{Train}(n-1)$, $x_1^{Train}(n-m)$ and $x_1^{Train}(n-M_1)$ are an (n−1)th element, an (n−m)th element, and an (n−$M_1$)th element in the training set, respectively, and $x_1^{Train}(n-1)$, $x_1^{Train}(n-m)$ and $x_1^{Train}(n-M_1)$ are all history elements.

The output of the radio frequency power amplifier output feedback circuit in the predistortion system is a complex scalar. The complex vectors in the training set are input to the predistortion system in accordance with element indexes, i.e., to a predistortion multiplier and a complex neural network in the predistortion system. The size of a complex vector which is input to the predistortion system each time may be determined by the power amplifier memory effect parameter, for example, one current element in the training set is input each time, and then the number of history elements that were input to the predistortion system is determined by the power amplifier memory effect parameter. There is no limitation on the means of determining the number of history elements, for example, the number of history elements is not greater than the power amplifier memory effect parameter.

After inputting the complex vector from the training set to the predistortion system and feeding the output of the radio frequency power amplifier output feedback circuit to the predistortion system, the loss function of the complex neural network in the predistortion system may be determined, and then based on the partial derivatives or sensitivities of the loss function with respect to elements in the correction vector which is output by the complex neural network, the partial derivatives or sensitivities of the loss function with respect to the weight parameter and the bias parameter of each layer within the complex neural network may be determined for use in updating the weight parameter and the bias parameter of the respective layer in the complex neural network, thereby enabling training of the predistortion system.

In an embodiment, a relationship between a complex vector which is input to the complex neural network in the predistortion system and a correction vector which is output by the complex neural network is as follows:

$$\vec{Z}_1^{Train}=ComplexNN(\vec{X}_1^{Train}),$$

where $\vec{Z}_1^{Train}=[z_1^{Train}(n-M_1), \ldots , z_1^{Train}(n-m), \ldots , z_1^{Train}(n-1), z_1^{Train}(n)]$, $\vec{Z}_1^{Train}$ is the correction vector, $z_1^{Train}(n)$, $z_1^{Train}(n-1)$, $z_1^{Train}(n-m)$ and $z_1^{Train}(n-M_1)$ are an nth element, an (n−1)th element, an (n−m)th element, and an (n−$m_1$)th element in the correction vector, respectively, and ComplexNN denotes a composite function of layer-by-layer operation functions within the complex neural network.

A relationship among a complex vector which is input to the predistortion multiplier in the predistortion system, the correction vector, and an output of the predistortion multiplier is as follows:

$$\vec{S}_1^{Train}=\vec{X}_1^{Train} \circ \vec{Z}_1^{Train},$$

where $\vec{S}_1^{Train}=[s_1^{Train}(n-M_1),s_1^{Train}(n-M_1+1), \ldots ,s_1^{Train}(n-1),s_1^{Train}(n)]$, $\vec{S}_1^{Train}$ is a complex vector which is output by the predistortion multiplier, $s_1^{Train}(n)$, $s_1^{Train}(n-1)$, $s_1^{Train}(n-M_1+1)$, and $s_1^{Train}(n-M_1)$ are an nth element, an (n−1)th element, an (n−M+1)th element, and an (n−$M_1$)th element in the complex vector which is output by the predistortion multiplier, $\vec{X}_1^{Train}$ is a complex vector which is input to the predistortion multiplier, and "∘" denotes dot multiplication.

A relationship between the output of the predistortion multiplier and the output of the radio frequency power amplifier output feedback circuit is as follows:

$$y_{1,raw}^{Train}=PA(\vec{S}_1^{Train}),$$

where $y_{1,raw}^{Train}$ the output of the radio frequency power amplifier output feedback circuit, and PA denotes a processing function of the radio frequency power amplifier output feedback circuit with respect to an input signal.

In the case where the predistortion system includes the second real-time power normalization unit, a relationship between an input and an output of the second real-time power normalization unit is as follows:

$$y_1^{Train}(n) = \frac{y_{1,raw}^{Train}(n)}{\sqrt{\overline{P}_{y_1}^{Train}(n)}}; \text{ and } \overline{P}_{y_1}^{Train}(n) = \frac{1}{n}\sum_{d=1}^{n}|y_{1,raw}^{Train}(d)|^2,$$

where $y_1^{Train}(n)$ is an nth output of the second real-time power normalization unit, $y_{1,raw}^{Train}(n)$ is an nth input of the second real-time power normalization unit, n is a positive integer, d is a positive integer greater than or equal to 1 and less than or equal to n, and $y_{1,raw}^{Train}(d)$ is a dth output of the radio frequency power amplifier output feedback circuit.

In an embodiment, determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network includes:

determining the loss function of the complex neural network based on a feedback quantity of the radio frequency power amplifier output feedback circuit and the complex vector which is input to the complex neural network; determining a partial derivative or sensitivity of the loss function with respect to each element in a correction vector which is output by the complex neural network; determining, according to the partial derivative or sensitivity for the correction vector, partial derivatives or sensitivities of the loss function with respect to a weight parameter and a bias parameter of each layer within the complex neural network; and updating, based on the partial derivatives or sensitivities for the weight parameter and the bias parameter of each layer, the weight parameter and the bias parameter of the respective layer.

In an embodiment, the loss function is determined by means of calculation through a calculation expression as follows:

$$E_1^{Train} = \frac{1}{2}\sum_{n=1}^{TrainSize}|y_1^{Train}(n) - x_1^{Train}(n)|^2,$$

wherein $E_1^{Train}$ is the loss function.

In the case where the predistortion system includes the second real-time power normalization unit, the feedback quantity of the radio frequency power amplifier output feedback circuit is an output of the second real-time power normalization unit obtained by inputting the output of the radio frequency power amplifier output feedback circuit to the second real-time power normalization unit; and in the case where the predistortion system does not include the second real-time power normalization unit, the feedback quantity of the radio frequency power amplifier output feedback circuit is the output of the radio frequency power amplifier output feedback circuit.

The partial derivative or sensitivity of the loss function with respect to each element in the correction vector which is output by the complex neural network may be determined based on the partial derivative or sensitivity of the loss function with respect to the output of the predistortion multiplier, the radio frequency power amplifier output feedback circuit and/or the second real-time power normalization unit in the predistortion system.

After the partial derivative or sensitivity for the correction vector is determined, in the present disclosure, the weight parameter and the bias parameter of each layer of the complex neural network may be updated based on the partial derivative or sensitivity for the correction vector.

In an embodiment, a calculation expression for the partial derivative or sensitivity for each element in the correction vector is as follows:

$$\delta_{z_1^{Train}} \triangleq \frac{\partial E_1^{Train}}{\partial z_1^{Train}} = conj(x_1^{Train}) \cdot \delta_{s_1^{Train}},$$

where $$\delta_{z_1^{Train}}$$

is the partial derivative or sensitivity for each element in the correction vector, $$\delta_{s_1^{Train}}$$

is a partial derivative or sensitivity of the loss function with respect to each element in a complex vector which is output by the predistortion multiplier, and conj(•) denotes taking a conjugate of a complex number; and $$\delta_{s_1^{Train}}$$

is determined by means of calculation through a calculation expression as follows:

$$\delta_{s_1^{Train}} \triangleq$$

$$\frac{\partial E_1^{Train}}{\partial s_1^{Train}} = \sum_{l=1}^{L_1}(A_{l,m} \cdot \delta_{l,m}) + [s_1^{Train} \cdot real(s_1^{Train})] \cdot \sum_{l=1}^{L_1}[B_{l,m} \cdot real(\delta_{l,m})] +$$

$$[s_1^{Train} \cdot imag(s_1^{Train})] \cdot \sum_{l=1}^{L_1}[B_{l,m} \cdot imag(\delta_{l,m})],$$

where $\begin{cases} A_{l,m} \triangleq |s_1^{Train}|^{l-1} \\ B_{l,m} \triangleq (l-1) \cdot |s_1^{Train}|^{l-3} \end{cases}$ $(l = 1, 2, \ldots, L_1; m = 0, 1, 2, \ldots, M_1)$, "•" denotes scalar multiplication, $L_1$ is a nonlinear order parameter, $s_1^{Train}$ is an element in a complex vector which is output by the predistortion multiplier, real(•) denotes taking a real part, imag(•) denotes taking an imaginary part, and $\delta_{l,m}$ denotes an intermediate partial derivative or sensitivity.

In an embodiment, in the case where the predistortion system does not include the second real-time power normalization unit, $\delta_{l,m}$ is determined through a calculation expression as follows:

$$\delta_{l,m} = conj(c_{l,m}) \cdot \delta_{y_1^{Train}};$$

in the case where the predistortion system includes the second real-time power normalization unit, $\delta_{l,m}$ is determined through a calculation expression as follows:

$$\delta_{l,m} = conj(c_{l,m}) \cdot \delta_{y_{1,raw}^{Train}},$$

where $c_{l,m}$ is a complex coefficient obtained using a least squares algorithm according to a memory polynomial model and based on a complex vector in the training set and an output obtained by inputting the complex vector to the radio frequency power amplifier output feedback circuit; and $$\delta_{y_{1,raw}^{Train}}$$

is a partial derivative or sensitivity of the loss function with respect to a complex scalar which is output by the radio frequency power amplifier output feedback circuit.

$$\delta_{y_{1,raw}^{Train}}$$

is determined by means of calculation through a calculation expression as follows:

$$\delta_{y_{1,raw}^{Train}} \triangleq \frac{\partial E_1^{Train}}{\partial y_{1,raw}^{Train}(n)} = \frac{1}{\sqrt{P_{y_1}^{Train}(n)}} \cdot \delta_{y_1^{Train}},$$

where $$\delta_{y_1^{Train}}$$

is a partial derivative or sensitivity of the loss function with respect to the feedback quantity of the radio frequency power amplifier output feedback circuit.

$$\delta_{y_1^{Train}}$$

is determined by means of calculation through a calculation expression as follows:

$$\delta_{y_1^{Train}} \triangleq \frac{\partial E_1^{Train}}{\partial y_1^{Train}(n)} = y_1^{Train}(n) - x_1^{Train}(n).$$

In an embodiment, partial derivatives or sensitivities for a weight parameter and a bias parameter of a full-connected layer within the complex neural network are as follows, respectively:

$$\delta_{W_{1,uv}^{Train,jk}} \triangleq \frac{\partial E_1^{Train}}{\partial W_{1,uv}^{Train,jk}} = conj(x_{1,u}^{Train,j}) \cdot conj\left(f'(x_{1,u}^{Train,j})\right) \cdot \delta_{x_{1,v}^{Train,k}}; \text{ and}$$

$$\delta_{b_{1,v}^{Train,k}} \triangleq \frac{\partial E_1^{Train}}{\partial b_{1,v}^{Train,k}} = \delta_{x_{1,v}^{Train,k}},$$

where $W_{1,uv}^{Train,jk}$ denotes a complex weight parameter of a connection from a uth neuron of a jth layer to a vth neuron of a kth layer in the complex neural network, $b_{1,v}^{Train,k}$ denotes a bias parameter of the vth neuron of the kth layer of the complex neural network, and $x_{1,u}^{Train,j}$ and $x_{1,v}^{Train,k}$ denote output complex vectors of the kth neuron of the jth layer and the vth neuron of the kth layer in the complex neural network, respectively; and $f'(\bullet)$ denotes a derivative of a neuron activation function with respect to an input signal, $$\delta_{W_{1,uv}^{Train,jk}}$$

is the partial derivative or sensitivity for the weight parameter of the full-connected layer, $$\delta_{b_{1,v}^{Train,k}}$$

is the partial derivative or sensitivity for the bias parameter of the full-connected layer, and $$\delta_{x_{1,v}^{Train,k}}$$

is a partial derivative or sensitivity of the loss function with respect to $x_{1,v}^{Train,k}$.

In the case where the current layer is the last layer of the complex neural network, the partial derivative or sensitivity of the loss function with respect to $x_{1,v}^{Train,k}$ is equal to the partial derivative or sensitivity for the correction vector.

In an embodiment, partial derivatives or sensitivities for a weight parameter and a bias parameter of a qth convolutional kernel of a convolutional layer within the complex neural network are as follows, respectively:

$$\vec{\delta}_{\vec{A}_{1,q}^{Train,k}} \triangleq \frac{\partial E_1^{Train}}{\partial \vec{A}_{1,q}^{Train,k}} = \sum_{p=1}^{P} Conv\left(Fliplr\left(conj(\vec{X}_{1,p}^{Train,j})\right), \vec{\delta}_{\vec{X}_{1,q}^{Train,k}}\right); \text{ and}$$

$$\delta_{b_{1,q}^{Train,k}} \triangleq \frac{\partial E_1^{Train}}{\partial b_{1,q}^{Train,k}} = \sum_{v=1}^{V} \delta_{x_{1,q,v}^{Train,k}},$$

where $$\vec{\delta}_{\vec{A}_{1,q}^{Train,k}}$$

is the partial derivation or sensitivity for the weight parameter of the qth convolutional kernel, $$\delta_{b_{1,q}^{Train,k}}$$

is the partial derivative or sensitivity for the bias parameter of the qth convolutional kernel, $\vec{X}_{1,p}^{Train,j}$ denotes a pth complex vector which is output by a previous layer for the convolutional layer, i.e., a jth layer, and $\vec{X}_{1,q}^{Train,k}$ denotes a qth complex vector which is output by a kth layer, q=1, 2, . . . , Q, and p=1, 2, . . . , P, where Q and P are the numbers of output feature vectors of the kth layer and the jth layer, respectively, $$\vec{\delta}_{\vec{X}_{1,q}^{Train,k}} = \left[\delta_{x_{1,q,1}^{Train,k}}, \ldots, \delta_{x_{1,q,v}^{Train,k}}, \ldots, \delta_{x_{1,q,V}^{Train,k}}\right]$$

denotes a partial derivative or sensitivity of the loss function with respect to $\vec{X}_{1,q}^{Train,k}$, and Fliplr($\bullet$) denotes position flipping of an input vector. Each feature map may be in the form of a complex vector.

In an embodiment, a weight parameter and a bias parameter of a full-connected layer within the complex neural network are updated through expressions as follows:

$$W_{1,uv}^{Train,jk}(n) = W_{1,uv}^{Train,jk}(n-1) - \alpha_{1,uv}^{Train,jk}(n) \cdot \delta_{W_{1,uv}^{Train,jk}}(n); \text{ and}$$

$$b_{1,v}^{Train,k}(n) = b_{1,v}^{Train,k}(n-1) - \alpha_{1,v}^{Train,k}(n) \cdot \delta_{b_{1,v}^{Train,k}}(n),$$

where $W_{1,uv}^{Train,jk}(n)$ and $W_{1,uv}^{Train,jk}(n-1)$ denote values of the weight parameter $W_{1,uv}^{Train,jk}$ of the full-connected layer at a current moment and at a previous moment, respectively; $b_{1,v}^{Train,k}(n)$ and $b_{1,v}^{Train,k}(n-1)$ denote values of the bias parameter $b_{1,v}^{Train,k}$ of the full-connected layer at a current moment and at a previous moment, respectively; $\alpha_{1,uv}^{Train,jk}(n)$ denotes an update step for the weight parameter $W_{1,uv}^{Train,jk}$ at the current moment; and $\alpha_{1,v}^{Train,k}(n)$ denotes an update step for the bias parameter $b_{1,v}^{Train,k}$ at the current moment.

In an embodiment, testing the trained predistortion system based on a test set to obtain an error vector magnitude and an adjacent channel leakage ratio corresponding to the predistortion system includes:

inputting complex vectors in the test set to the predistortion system in accordance with element indexes, where a size of a complex vector which is input each time is determined based on a power amplifier memory effect parameter, and a complex vector which is input to the predistortion system each time is obtained by combining a history element and a current element in the test set; and inputting an output of the radio frequency power amplifier output feedback circuit in the predistortion system to the predistortion system to determine a generalization error vector magnitude and a generalization adjacent channel leakage ratio corresponding to the predistortion system.

The testing of the trained predistortion system based on the test set is performed in a similar way to the training of the predistortion system based on the training set, except that for the testing based on the test set, the weight parameters and bias parameters of the layers in the complex neural network do not need to be updated, the generalization error vector magnitude and the generalization adjacent channel leakage ratio are directly calculated to determine whether the generalization error vector magnitude and the generalization adjacent channel leakage ratio meet the set requirements. In the calculation of the generalization error vector magnitude and the generalization adjacent channel leakage ratio, they may be determined based on the feedback quantity of the radio frequency power amplifier output feedback circuit and the corresponding complex vector in the test set, and the like.

Inputting an output of the radio frequency power amplifier output feedback circuit in the predistortion system to the predistortion system includes inputting the output of the radio frequency power amplifier output feedback circuit to the complex neural network after passing it through a second real-time power normalization unit included in the predistortion system; or inputting the output of the radio frequency power amplifier output feedback circuit directly to the complex neural network.

In an embodiment, the generalization error vector magnitude and the generalization adjacent channel leakage ratio are determined through calculation expressions as follows, respectively:

$$GEVM_1 = 10 \cdot \log_{10}\left(\frac{\sum_{n=1}^{TestSize} |y_1^{Test}(n) - x_1^{Test}(n)|^2}{\sum_{n=1}^{TestSize} |x_1^{Test}(n)|^2}\right);$$

$$GACLR(y_1^{Test}) = 10 \cdot \log_{10}\left(\frac{\sum_{f=HBW+2GBW}^{2HBW+2GBW} \bar{P}_{y_1^{Test}}(f)}{\sum_{f=0}^{HBW} \bar{P}_{y_1^{Test}}(f)}\right);$$

$$\bar{P}_{y_1^{Test}}^k = |FFT(y_1^{Test}(n_{rnd}^k:(n_{rnd}^k + NFFT - 1)) \circ Win_{NFFT})|^2 (k = 1, 2, \ldots, K);$$

and $$\bar{P}_{y_1^{Test}}(f) = \frac{1}{K}\sum_{k=1}^{K}\bar{P}_{y_1^{Test}}^k(f),$$

where $GEVM_1$ denotes the generalization error vector magnitude, $GACLR(y_1^{Test})$ denotes the generalization adjacent channel leakage ratio of $y_1^{Test}$, $y_1^{Test}$ denotes a feedback quantity of the radio frequency power amplifier output feedback circuit, $y_1^{Test}(n)$ denotes an nth element feedback quantity of the radio frequency power amplifier output feedback circuit, $x_1^{Test}(n)$ denotes an nth element of a corresponding complex vector in the test set, TestSize denotes a size of the test set, the sum of TestSize and TrainSize is $N_1$, $N_1$ denotes a size of the training complex vector, HBW denotes half of an effective signal bandwidth, GBW denotes half of a guard bandwidth, and NFFT denotes the number of points of the discrete Fourier transform; $Win_{NFFT}$ is a coefficient vector of a window function with a window length NFFT and $y_1^{Test}(n_{rnd}^k:(n_{rnd}^k+NFFT-1))$ denotes a signal of length NFFT which is randomly intercepted from $y_1^{Test}$; $n_{rnd}^k$ is a random positive integer uniformly distributed in a value range [1,TestSize]; and K is the number of times of random interceptions.

In the case where the predistortion system includes the second real-time power normalization unit, the feedback quantity of the radio frequency power amplifier output feedback circuit may be considered to be the output of the second real-time power normalization unit; and in the case where the predistortion system does not include the second real-time power normalization unit, the feedback quantity of the radio frequency power amplifier output feedback circuit may be the output of the radio frequency power amplifier output feedback circuit.

An exemplary description of the present disclosure will be provided below. The predistortion method provided in the present disclosure solves the problems of the inherent deficiency of nonlinear representation capability and the lack of generalization capability of conventional power amplifier models and predistortion models, and obtains better error vector magnitude (EVM) performance and adjacent channel leakage ratio (ACLR) performance.

The present disclosure adopts the neural network with more abundant structural forms to model the system, which solves the inherent deficiency of nonlinear expression capability of conventional power amplifier models and DPD models; at the same time, the present disclosure completely abandons the separate processing manner for the method and technology of applying neural networks for predistortion, but integrates the characteristic learning of the power amplifier with the predistortion correction as a whole for processing from the beginning to the end. The present disclosure proposes for the first time an AI-DPD integrated scheme, i.e., an integrated scheme in which artificial intelligence replaces DPD.

In an embodiment, before sending a service complex vector, a known training complex vector is sent and passed through the predistortion multiplier, the complex neural network, and the radio frequency power amplifier output feedback circuit, and is then, together with the training complex vector, used for the training of the AI-DPD integrated scheme system (i.e., the predistortion system); and after the training reaches the required GEVM and GACLR, the training is stopped; and at the same time, the service complex vector is sent and passed through the predistortion system which outputs a predistortion corrected complex scalar.

Figure 3A:
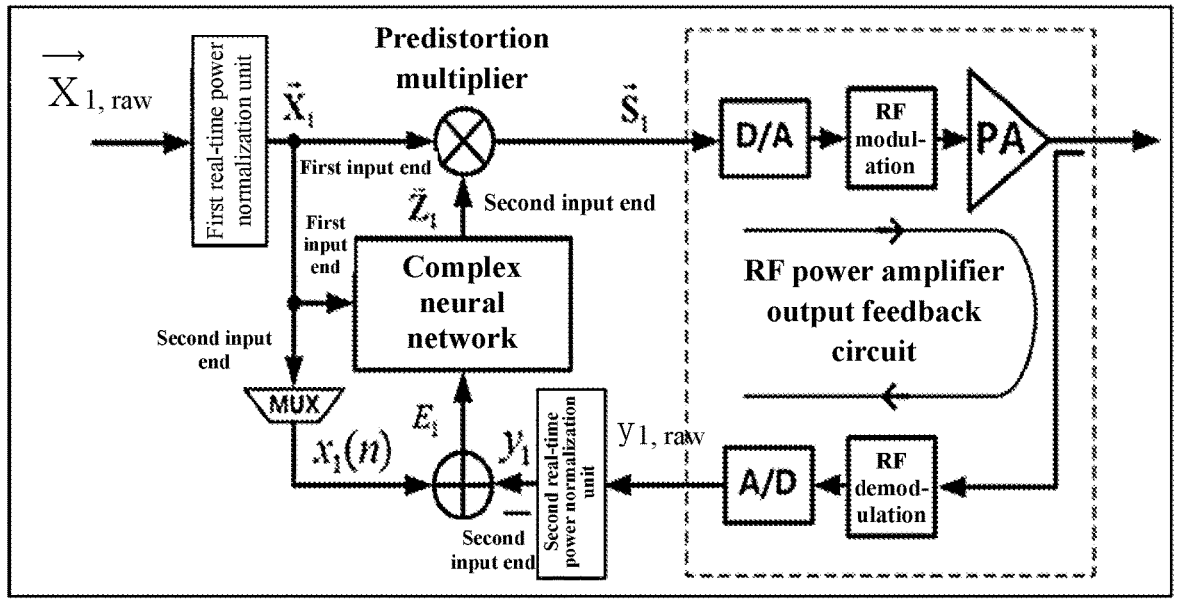
FIG. 3a is a schematic diagram of a predistortion system provided by an embodiment of the present disclosure.

FIG. 3a illustrates a schematic diagram of a predistortion system provided in an embodiment of the present disclosure. As shown in FIG. 3a, the predistortion system, i.e., the AI-DPD integrated scheme system, mainly includes: a first real-time power normalization (i.e., PNorm) unit, a second real-time power normalization unit, a predistortion multiplier (i.e., a DPD multiplier) unit, a complex neural network unit, and a radio frequency power amplifier output feedback circuit. Here, the predistortion multiplier unit is a predistortion multiplier; the complex neural network unit may include a complex neural network, a multiplexer (i.e., MUX), and an adder; and the radio frequency power amplifier output feedback circuit includes a digital-to-analog converter unit (i.e., D/A), a radio frequency modulation unit, a power amplifier unit, an analog-to-digital converter unit (i.e., A/D), and a radio frequency demodulation unit.

Here, $\vec{X}_{1,raw}$ is a raw input complex vector formed by a history element (the size of the history element is set by the power amplifier memory effect parameter $M_1$) and a current element; $\vec{X}_1$ is a complex vector obtained after real-time power normalization of $\vec{X}_{1,raw}$, and $\vec{X}_1$ is also an input to the complex neural network; $\vec{Z}_1$ is a complex correction vector obtained after predistortion of the input vector $\vec{X}_1$, and $\vec{Z}_1$ is also an output of the complex neural network; $\vec{S}_1$ is a predistortion corrected complex vector; $y_{1,raw}$ is the final raw output of the AI-DPD integrated scheme, and $y_{1,raw}$ is a complex scalar; and $y_1$ is a complex scalar obtained after real-time power normalization of $y_{1,raw}$.

The complex neural network is a neural network in which: a complex number consists of two parts, the real part (hereafter abbreviated as I-way) and the imaginary part (hereafter abbreviated as Q-way), and herein, the imaginary part is usually not 0, so as to distinguish the complex number from a real number. The input and output of the neural network may be directly complex variables, vectors, matrices or tensors, or may be in the form of a combination of the complex I-way and Q-way; the inputs and outputs of the neuronal activation functions of the layers of this neural network and all other processing functions may be directly complex variables, vectors, matrices or tensors, or may be in the form of a combination of the complex I-way and Q-way; and the neural network may be trained using either a complex error back propagation algorithm (Complex BP) or a real error back propagation algorithm (BP).

The complex error back propagation algorithm includes, but is not limited to, the following steps:

At step 1: initialization of parameters of the AI-DPD integrated scheme system.

The nonlinear order parameter $L_1$ and the power amplifier memory effect parameter $M_1$ are set, for example: $L_1=5$, and $M_1=4$; the elements of the initial output of the complex neural network, i.e., the initial predistortion correction vector $\vec{Z}_1$, are set to 1; and either layer by layer in accordance with the indexes of the layers in the forward operation direction or simultaneously for all layers in parallel, the corresponding initialization steps may be performed according to the layer types. The initialization of the different types of layers mainly includes, but is not limited to, the following steps:

At step 1-1: in response to the current (to-be-initialized) layer being a full-connected layer, the weight parameter and the bias parameter of the layer are initialized according to the randomly initialized distribution type (e.g., Gaussian distribution, uniform distribution, etc.) and distribution parameter (the mean value, the variance, the standard deviation, etc.) that are set for that layer; at step 1-2: in response to the current (to-be-initialized) layer being a convolutional layer, the weight parameter and the bias parameter of each convolution kernel of the layer are initialized according to the randomly initialized distribution type and distribution parameter that are set for that layer; and at step 1-3: in response to the current (to-be-initialized) layer being another type of layer, such as a fractionally strided convolution layer, the initialization of the weight parameter and the bias parameter of that layer is completed according to the initialization setting parameters of that type of layer (e.g., the randomly initialized distribution type and distribution parameter).

At step 2: the training of the AI-DPD integrated scheme system based on the training set. Firstly, real-time power normalization (PNorm) is performed on a known training complex vector sequence $\{x_1^{raw}(n)\}_{n=1}^{N_1}$ of size $N_1$, where there are multiple variations of real-time power normalization, one of them is provided below as an example:

$$\bar{P}_{x_1}(n) = \frac{1}{n}\sum_{d=1}^{n}|x_{1,raw}(d)|^2 \quad (2\text{-}1)$$

$$x_1(n) = \frac{x_{1,raw}(n)}{\sqrt{\bar{P}_{x_1}(n)}} \quad (2\text{-}2)$$

Then, the sequence $\{x_1(n)\}_{n=1}^{N_1}$ for which real-time power normalization has been performed is split into a training set $\{x_1^{Train}(n)\}_{n=1}^{TrainSize}$ and a test set $\{x_1^{Test}(n)\}_{n=1}^{TestSize}$ in a certain ratio (e.g., 0.5:0.5), and the sizes of the two are denoted as TrainSize and TestSize, respectively, where the training set is used for the overall learning or training of the AI-DPD integrated scheme system; the test set is used to test the generalization adaptation performance of the scheme system to new data in the second half of the training; and this performance includes the generalization EVM performance and the generalization ACPR performance, which are defined as follows, respectively:

$$GEVM_1 = 10 \cdot \log_{10}\left(\frac{\sum_{n=1}^{TestSize}|y_1^{Test}(n) - x_1^{Test}(n)|^2}{\sum_{n=1}^{TestSize}|x_1^{Test}(n)|^2}\right) \quad (2\text{-}3)$$

$$GACLR(y_1^{Test}) = 10 \cdot \log_{10}\left(\frac{\sum_{f=HBW+2GBW}^{2HBW+2GBW}\bar{P}_{y_1^{Test}}(f)}{\sum_{f=0}^{HBW}\bar{P}_{y_1^{Test}}(f)}\right) \quad (2\text{-}4)$$

where HBW refers to half of the effective signal bandwidth; GBW refers to half of the guard bandwidth; and $$\bar{P}_{y_1^{Test}}(f)$$

is calculated as follows:

$$\bar{P}_{y_1^{Test}}^k = \quad (2\text{-}5)$$

$$|FFT(y_1^{Test}(n_{rnd}^k:(n_{rnd}^k + NFFT - 1))\circ Win_{NFFT})|^2 (k = 1, 2, \ldots, K)$$

$$\bar{P}_{y_1^{Test}}(f) = \frac{1}{K}\sum_{k=1}^{K}\bar{P}_{y_1^{Test}}^k(f) \quad (2\text{-}6)$$

where NFFT is the number of points of the discrete Fourier transform (FFT); $Win_{NFFT}$ is the coefficient vector of the window function with a window length of NFFT, for example: the window function may be a Blackman window; $y_1^{Test}(n_{rnd}^k:(n_{rnd}^k+NFFT-1))$ denotes a signal of length NFFT which is randomly intercepted from $y_1^{Test}$; $n_{rnd}^k$ is a random positive integer uniformly distributed in a value range [1,TestSize]; and K is the number of times of random interceptions; and "$\circ$" denotes dot multiplication.

The training of the AI-DPD integrated scheme system includes, but is not limited to, the following sub-steps:

At step 2-1: in accordance with the element indexes n (n=1, 2, . . . , TrainSize), the training set $\{x_1^{Train}(n)\}_{n=1}^{TrainSize}$ is continuously input to the system by means of organization in the form of a complex vector $\vec{X}_1^{Train}$ formed by combining a history element and a current element each time as follows:

$$\vec{X}_1^{Train}=[x_1^{Train}(n-M_1),\ldots,x_1^{Train}(n-m),\ldots,x_1^{Train}(n-1),x_1^{Train}(n)] \quad (2\text{-}7)$$

where $M_1$ is the power amplifier memory effect parameter, $0 \leq M_1 \leq TrainSize$ At step 2-2: the complex vector $\vec{X}_1^{Train}$ is passed through the complex neural network (hereinafter abbreviated as ComplexNN) unit to obtain the predistorted complex correction vector $\vec{Z}_1^{Train}$, where the relationship between the input and output of this unit is shown as the following expression:

$$\vec{Z}_1^{Train}=[z_1^{Train}(n-M_1),\ldots,z_1^{Train}(n-m),\ldots,z_1^{Train}(n-1),z_1^{Train}(n)] \quad (2\text{-}8)$$

$$\vec{Z}_1^{Train}=ComplexNN(\vec{X}_1^{Train}) \quad (2\text{-}9)$$

At step 2-3: the complex vector $\vec{X}_1^{Train}$ is passed through a predistortion multiplier (DPD multiplier) unit to obtain the predistortion corrected complex vector $\vec{S}_1^{Train}$, where the relationship between the input and output of this unit is shown as the following expression:

$$\vec{S}_1^{Train}=[s_1^{Train}(n-M_1),s_1^{Train}(n-M_1+1),\ldots,s_1^{Train}(n-1),s_1^{Train}(n)] \quad (2\text{-}10)$$

$$\vec{S}_1^{Train}=\vec{X}_1^{Train}\circ\vec{Z}_1^{Train} \quad (2\text{-}11)$$

where "∘" denotes dot multiplication.

At step 2-4: the predistortion corrected complex vector $\vec{S}_1^{Train}$ is input to the radio frequency power amplifier output feedback circuit, and the output obtained is $y_{1,raw}^{Train}$, where the relationship between the output of the predistortion multiplier and the output of the radio frequency power amplifier output feedback circuit is shown as the following expression:

$$y_{1,raw}^{Train}=PA(\vec{S}_1^{Train}) \quad (2\text{-}12)$$

The power amplifier (PA) unit in the radio frequency power amplifier output feedback circuit may be any actual power amplifier product; in other words, this embodiment has no restrictions on the nonlinear characteristics of the power amplifier model.

At Step 2-5: the final raw output $y_{1,raw}^{Train}$ of the AI-DPD integrated scheme, after being subjected to radio frequency demodulation and analog-to-digital conversion (A/D), is input to a real-time power normalization (PNorm) unit to obtain a power amplifier output feedback quantity $y_1^{Train}$, where the relationship between the input and output of this unit is shown as the following two expressions:

$$\overline{P}_{y_1}^{Train}(n)=\frac{1}{n}\sum_{d=1}^{n}|y_{1,raw}^{Train}(d)|^2 \quad (2\text{-}13)$$

$$y_1^{Train}(n)=\frac{y_{1,raw}^{Train}(n)}{\sqrt{\overline{P}_{y_1}^{Train}(n)}} \quad (2\text{-}14)$$

At step 2-6: the loss function of the complex neural network is calculated according to the power amplifier output feedback quantity $y_1^{Train}$ and the complex vector $\vec{X}_1^{Train}$. Since there are many variations of the additional regularization term, only as a simple example, a loss function expression is provided below for illustration:

$$E_1^{Train}=\frac{1}{2}\sum_{n=1}^{TrainSize}|y_1^{Train}(n)-x_1^{Train}(n)|^2 \quad (2\text{-}15)$$

At step 2-7: the partial derivative or sensitivity $$\delta_{y_1^{Train}}$$

of the loss function $E_1^{Train}$ with respect to the power amplifier output feedback quantity $y_1^{Train}$ is calculated according to the following expression (2-16):

$$\delta_{y_1^{Train}}\triangleq\frac{\partial E_1^{Train}}{\partial y_1^{Train}(n)}=y_1^{Train}(n)-x_1^{Train}(n) \quad (2\text{-}16)$$

At step 2-8: the partial derivative or sensitivity $$\delta_{y_{1,raw}^{Train}}$$

of the loss function $E_1^{Train}$ with respect to the final raw output $y_{1,raw}^{Train}$ of the AI-DPD integrated scheme is calculated according to the above sensitivity $$\delta_{y_1^{Train}}$$

based on expression (2-17) as follows:

$$\delta_{y_{1,raw}^{Train}}\triangleq\frac{\partial E_1^{Train}}{\partial y_{1,raw}^{Train}(n)}=\frac{1}{\sqrt{\overline{P}_{y_{1,raw}^{Train}}(n)}}\cdot\delta_{y_1^{Train}} \quad (2\text{-}17)$$

where $\overline{P}_{y_1}^{Train}$ is obtained by means of calculation through the above expression (2-13).

At step 2-9: the following intermediate partial derivative or sensitivity $\delta_{l,m}$ is calculated according to the above sensitivity $$\delta_{y_{1,raw}^{Train}}$$

based on the following expression (2-18):

$$\delta_{l,m}=conj(c_{l,m})\cdot\delta_{y_{1,raw}^{Train}} \quad (2\text{-}18)$$

where $c_{l,m}$ is a complex coefficient obtained using a least squares algorithm according to a memory polynomial model and based on a complex vector in the training set and an output obtained by inputting the complex vector to the radio frequency power amplifier output feedback circuit; and conj(●) denotes taking a conjugate of a complex number.

At step 2-10: the partial derivative or sensitivity $$\delta_{s_1^{Train}}$$

of the loss function $E_1^{Train}$ with respect to each element of the predistortion corrected complex vector $\vec{S}_1^{Train}$ according to the above sensitivity $\delta_{l,m}$ based on the following expression (2-19):

$$\delta_{s_1^{Train}} \triangleq \frac{\partial E_1^{Train}}{\partial s_1^{Train}} = \sum_{l=1}^{L_1}(A_{l,m} \cdot \delta_{l,m}) + \left[s_1^{Train} \cdot \text{real}\left(s_1^{Train}\right)\right] \cdot \qquad (2\text{-}19)$$

$$\sum_{l=1}^{L_1}[B_{l,m} \cdot \text{real}\,(\delta_{l,m})] + \left[s_1^{Train} \cdot \text{imag}(s_1^{Train})\right] \cdot \sum_{l=1}^{L_1}[B_{l,m} \cdot \text{imag}(\delta_{l,m})]$$

$$\begin{cases} A_{l,m} \triangleq |s_1^{Train}|^{l-1} \\ B_{l,m} \triangleq (l-1) \cdot |s_1^{Train}|^{l-3} \end{cases} (l = 1, 2, \ldots, L_1; m = 0, 1, 2, \ldots, M_1) \qquad (2\text{-}20)$$

In order to avoid the extreme value case where the input is 0+0j, in response to there being a zero element (i.e., 0+0j) in the predistortion corrected complex vector $\vec{S}_1^{Train}$, $B_{l,m}$ defined by expression (2-20) above is set to 0.

At step 2-11: the partial derivative or sensitivity $$\delta_{z_1^{Train}}$$

of the loss function $E_1^{Train}$ with respect to each element of the predistorted complex correction vector $\vec{Z}_1^{Train}$ according to the above sensitivity $$\delta_{s_1^{Train}}$$

based on the following expression (2-21):

$$\delta_{z_1^{Train}} \triangleq \frac{\partial E_1^{Train}}{\partial z_1^{Train}} = conj(x_1^{Train}) \cdot \delta_{s_1^{Train}} \qquad (2\text{-}21)$$

At step 2-12: according to the sensitivity $$\delta_{z_1^{Train}}$$

described above, in the reverse order of the forward operation of the complex neural network units, the partial derivatives or sensitivities of the loss function $E_1^{Train}$ with respect to the weight parameter and the bias parameter of each layer therein are calculated sequentially, including, but not limited to, the following sub-steps:

At step 2-12-1: in response to the current to-be-calculated layer being a full-connected layer, the partial derivative or sensitivity of the loss function $E_1^{Train}$ with respect to the complex weight parameter $W_{1,uv}^{Train,jk}$ and the complex bias parameter $b_{1,v}^{Train,k}$ of that layer are calculated according to the following expressions (2-22) and (2-23), respectively:

$$\delta_{W_{1,uv}^{Train,jk}} \triangleq \frac{\partial E_1^{Train}}{\partial W_{1,uv}^{Train,jk}} = conj(x_{1,u}^{Train,j}) \cdot conj\left(f'(x_{1,u}^{Train,j}) \cdot \delta_{x_{1,v}^{Train,k}}\right) \qquad (2\text{-}22)$$

$$\delta_{b_{1,v}^{Train,k}} \triangleq \frac{\partial E_1^{Train}}{\partial b_{1,v}^{Train,k}} = \delta_{x_{1,v}^{Train,k}} \qquad (2\text{-}23)$$

where $W_{1,uv}^{Train,jk}$ denotes a complex weight of the connection from a uth neuron in a jth layer to a vth with neuron in a kth layer in the network; $x_{1,u}^{Train,j}$ and $x_{1,v}^{Train,k}$ denote output complex vectors of the uth neuron of the jth layer and the vth neuron of the kth layer in the network, respectively; and $f'(\bullet)$ denotes a derivative of the neuron activation function with respect to an input signal.

At step 2-12-2: in response to the current to-be-calculated layer (set as the kth layer) being a convolutional layer, the partial derivatives or sensitivities of the loss function $E_1^{Train}$ with respect to the complex weight $\vec{\Lambda}_{1,q}^{Train,k}$ and the complex bias $b_{1,q}^{Train,k}$ of the qth (q=1, 2, . . . , Q) convolution kernel of that layer are calculated according to the following expressions (2-24) and (2-25), respectively:

$$\delta_{\vec{\Lambda}_{1,q}^{Train,k}} \triangleq \frac{\partial E_1^{Train}}{\partial \vec{\Lambda}_{1,q}^{Train,k}} = \sum_{p=1}^{P} Conv\left(Fliplr\left(conj(\vec{X}_{1,p}^{Train,j})\right), \delta_{\vec{X}_{1,q}^{Train,k}}\right) \qquad (2\text{-}24)$$

$$\delta_{b_{1,q}^{Train,k}} \triangleq \frac{\partial E_1^{Train}}{\partial b_{1,q}^{Train,k}} = \sum_{v=1}^{V} \delta_{x_{1,q,v}^{Train,k}} \qquad (2\text{-}25)$$

where $\vec{X}_{1,p}^{Train,j}$ denotes a pth (p=1, 2, . . . , P) complex vector which is output from the previous layer (the jth layer) of this convolutional layer; $\vec{X}_{1,q}^{Train,k}$ denotes a qth complex vector which is output by the current convolutional layer (the kth layer); $\vec{\delta}_{\vec{X}_{1,q}^{Train,k}} = [\delta_{x_{1,q,1}^{Train,k}}, \ldots, \delta_{x_{1,q,v}^{Train,k}}, \ldots, \delta_{x_{1,q,V}^{Train,k}}]$ denotes the partial derivative or sensitivity of the loss function $E_1^{Train}$ with respect to the above $\vec{X}_{1,q}^{Train,k}$; Conv($\bullet$) denotes the convolution operation; and Fliplr($\bullet$) denotes position flipping of the input vector.

At step 2-13: parameter updating is performed according to the sensitivity of the loss function $E_1^{Train}$ calculated for each layer with respect to the weight parameter and the bias parameter, where since there are various parameter updating approaches for different training algorithms, only a simple example is provided below for illustration:

$$W_{1,uv}^{Train,jk}(n) = W_{1,uv}^{Train,jk}(n-1) - \alpha_{1,uv}^{Train,jk} \cdot \delta_{W_{1,uv}^{Train,jk}} \qquad (2\text{-}26)$$

$$b_{1,v}^{Train,k}(n) = b_{1,v}^{Train,k}(n-1) - \alpha_{1,v}^{Train,k} \cdot \delta_{b_{1,v}^{Train,k}} \qquad (2\text{-}27)$$

At step 3: performance statistics of the AI-DPD integrated scheme system based on the test set.

At step 3-1: in accordance with the element index n (n=1, 2, . . . , TestSize), the test set $\{x_1^{Test}(n)\}_{n=1}^{TestSize}$ is continuously input to the system by means of organization in the form of a complex vector $\vec{X}_1^{Test}$ formed by combining a history element and a current element each time as follows:

$$\vec{X}_1^{Test} = [x_1^{Test}(n-M_1), \ldots, x_1^{Test}(n-m), \ldots, x_1^{Test}(n-1), x_1^{Test}(n)] \qquad (2\text{-}28)$$

At step 3-2: the complex vector $\vec{X}_1^{Test}$ is passed through the complex neural network unit to obtain the predistorted complex correction vector $\vec{Z}_1^{Test}$ as follows:

$$\vec{Z}_1^{Test}=[z_1^{Test}(n-M_1), \ldots, z_1^{Test}(n-m), \ldots, z_1^{Test}(n-1), z_1^{Test}(n)] \quad (2\text{-}29)$$

$$\vec{Z}_1^{Test}=\text{ComplexNN}(\vec{X}_1^{Test}) \quad (2\text{-}30)$$

At step 3-3: the complex vector $\vec{X}_1^{Test}$ is passed through the predistortion multiplier (DPD multiplier) unit to obtain the predistortion corrected complex vector $\vec{S}_1^{Test}$:

$$\vec{S}_1^{Test}=[s_1^{Test}(n-M), s_1^{Test}(n-M+1), \ldots, s_1^{Test}(n-1), s_1^{Test}(n)] \quad (2\text{-}31)$$

$$\vec{S}_1^{Train}=\vec{X}_1^{Train} \circ \vec{Z}_1^{Train} \quad (2\text{-}32)$$

At step 3-4: the predistortion corrected complex vector $\vec{S}_1^{Test}$ is input to the radio frequency power amplifier output feedback circuit to obtain the output $y_{1,raw}^{Test}$:

$$y_{1,raw}^{Test}=\text{PA}(\vec{S}_1^{Test}) \quad (2\text{-}33)$$

At Step 3-5: the $y_{1,raw}^{Test}$ is subjected to the radio frequency demodulation and the analog-to-digital conversion (A/D), and is then input to the real-time power normalization (PNorm) unit to obtain a power amplifier output feedback quantity $y_1^{Test}$:

$$\overline{P}_{y_1}^{Test}(n) = \frac{1}{n}\sum_{d=1}^{n}\left|y_{1,raw}^{Test}(d)\right|^2 \quad (2\text{-}34)$$

$$y_1^{Test}(n) = \frac{y_{1,raw}^{Test}(n)}{\sqrt{\overline{P}_{y_1}^{Test}(n)}} \quad (2\text{-}35)$$

At step 3-6: according to the above $y_1^{Test}$ and the $x_1^{Test}$ of the test set, the generalization EVM performance (GEVM) and generalization ACLR performance (GACLR) of the system based on the test set are statistically calculated based on the above expressions (2-3) and (2-4).

At step 3-7: in response to the GEVM and GACLR meeting the set indicator requirements, the training of the AI-DPD integrated scheme system is stopped; otherwise, the process returns to the execution of all steps in step 2 and a new round of training is started.

In an embodiment, before sending a service complex vector, a known training complex vector is sent and passed through the predistortion multiplier, the complex neural network, and the radio frequency power amplifier output feedback circuit, and a predistortion corrected complex scalar is output and obtained, and is then fed back to a sending end and is, together with the training complex vector, used for the training of the AI-DPD integrated scheme system; and the training is stopped in response to the training reaching the required generalization EVM performance and generalization ACLR performance; and at the same time, the service complex vector is sent and passed through the predistortion system which outputs a predistortion corrected complex scalar.

Figure 3B:
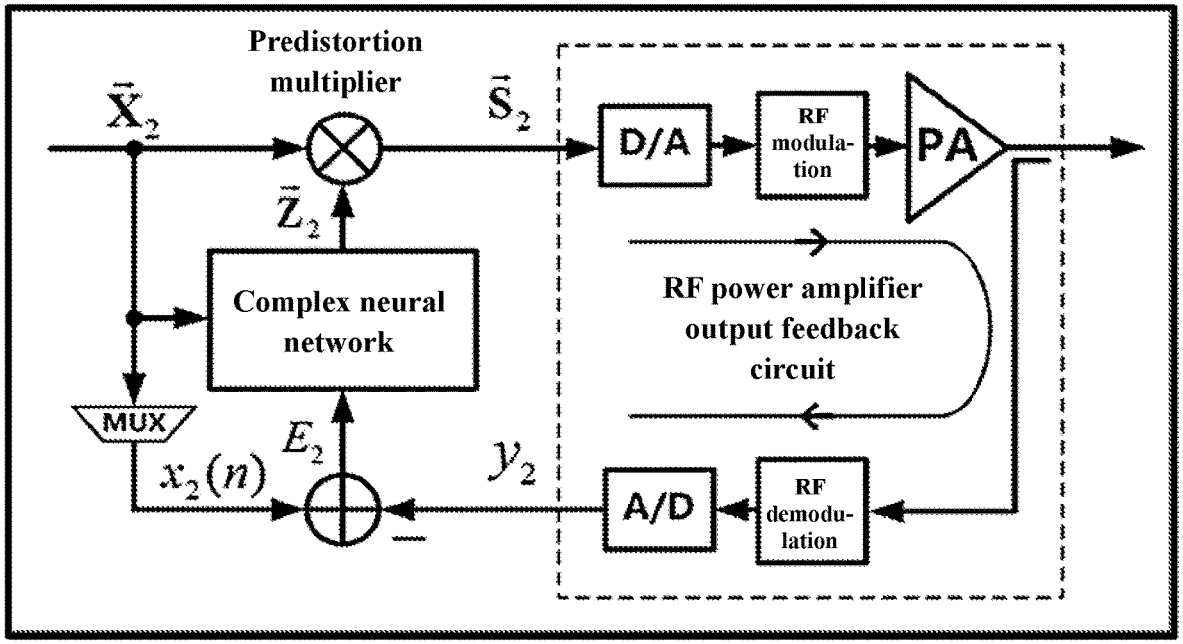
FIG. 3b is a schematic diagram of another predistortion system provided by an embodiment of the present disclosure.

FIG. 3b illustrates a schematic diagram of another predistortion system provided in an embodiment of the present disclosure. As shown in FIG. 3b, the predistortion system, which is also referred to as an AI-DPD integrated scheme system, mainly includes: a predistortion multiplier unit, a complex neural network unit, and a radio frequency power amplifier output feedback circuit. Here, $\vec{X}_2$ is a raw input complex vector consisting of a history element (the size of the history element is set by the power amplifier memory effect parameter $M_2$) and a current element; $\vec{Z}_2$ is a complex correction vector obtained after predistortion of the input vector $\vec{X}_2$, and $\vec{Z}_2$ is also an output of the complex neural network; $\vec{S}_2$ is a predistortion corrected complex vector; $y_2$ is the final output of the AI-DPD integrated scheme, and $y_2$ is a complex scalar. The subscripts "1" and "2" in each expression in the present disclosure have no practical meaning and are for the two predistortion systems corresponding to FIG. 3a and FIG. 3b, respectively. If $M_1$ and $M_2$ only indicate power amplifier memory effect parameters, i.e., power amplifier memory effect parameters, the subscript "1" is for the predistortion system shown in FIG. 3a, and the subscript "2" is for the predistortion system shown in FIG. 3b.

The complex neural network is a neural network in which: a complex number consists of two parts, the real part and the imaginary part, and herein the imaginary part is not 0, so as to distinguish the complex number from a real number; the input and output of the neural network may be directly complex variables, vectors, matrices or tensors, or may be in the form of a combination of the complex I-way and Q-way; the inputs and outputs of the neuronal activation functions of the layers of this neural network and all other processing functions may be either directly complex variables, vectors, matrices or tensors, or a combination of the complex I-way and Q-way; and the neural network may be trained using either a complex error back propagation algorithm, or a real error back propagation algorithm.

The complex error back propagation algorithm includes, but is not limited to, the following steps:

At step 1, initialization of parameters of the AI-DPD integrated scheme system.

The nonlinear order parameter $L_2$ and the power amplifier memory effect parameter $M_2$ are set, for example: $L_2=5$, and $M_2=4$; the elements of the initial output of the complex neural network, i.e., the initial predistortion correction vector $\vec{Z}_2$, are set to 1; and either layer by layer in accordance with the indexes of the layers in the forward operation direction or simultaneously for all layers in parallel, the corresponding initialization steps may be performed according to the layer types. The initialization of the different types of layers mainly includes, but is not limited to, the following steps:

At step 1-1: in response to the current (to-be-initialized) layer being a full-connected layer, the weight parameter and the bias parameter of the layer are initialized according to the randomly initialized distribution type (e.g., Gaussian distribution, uniform distribution, etc.) and distribution parameter (the mean value, the variance, the standard deviation, etc.) that are set for that layer; at step 1-2: in response to the current (to-be-initialized) layer being a convolutional layer, the weight parameter and the bias parameter of each convolution kernel of the layer are initialized according to the randomly initialized distribution type and distribution parameter that are set for that layer; and at step 1-3: in response to the current (to-be-initialized) layer being another type of layer, the initialization of the weight parameter and the bias parameter of that layer is completed in accordance with the initialization setting parameter of that type of layer.

At step 2: the training of the AI-DPD integrated scheme system based on the training set. A known training complex vector sequence $\{x_2(n)\}_{n=1}^{N_2}$ of size $N_2$ is split into a training set $\{x_2^{Train}(n)\}_{n=1}^{TrainSize}$ and a test set $\{x_2^{Test}(n)\}_{n=1}^{TestSize}$ in a certain ratio (e.g., 0.5:0.5) and the sizes of the two are denoted as TrainSize and TestSize, respectively, where the training set is used for the overall learning or training of the AI-DPD integrated scheme system; the test set is used to test the generalization adaptation performance of the scheme system to new data in the second half of the training; and this performance includes the generalization EVM performance (GEVM) and the generalization ACPR performance (GACLR), which are defined as follows, respectively:

$$GEVM_2 = 10 \cdot \log_{10} \left( \frac{\sum_{n=1}^{TestSize} |y_2^{Test}(n) - x_2^{Test}(n)|^2}{\sum_{n=1}^{TestSize} |x_2^{Test}(n)|^2} \right) \quad (2\text{-}36)$$

$$GACLR(y_2^{Test}) = 10 \cdot \log_{10} \left( \frac{\sum_{f=HBW+2GBW}^{2HBW+2GBW} \overline{P}_{y_2^{Test}}(f)}{\sum_{f=0}^{HBW} \overline{P}_{y_2^{Test}}(f)} \right) \quad (2\text{-}37)$$

where HBW refers to half of the effective signal bandwidth; GBW refers to half of the guard bandwidth; and $$\overline{P}_{y_2^{Test}}(f)$$

is calculated as follows:

$$\overline{P}_{y_2^{Test}}^k = \quad (2\text{-}38)$$
$$|FFT(y_2^{Test}(n_{rnd}^k:(n_{rnd}^k + NFFT - 1)) \circ Win_{NFFT})|^2 \quad (k = 1, 2, \ldots, K)$$

$$\overline{P}_{y_2^{Test}}(f) = \frac{1}{K} \sum_{k=1}^{K} \overline{P}_{y_2^{Test}}^k(f) \quad (2\text{-}39)$$

where NFFT is the number of points of the discrete Fourier transform (FFT); $Win_{NFFT}$ is the coefficient vector of the window function with a window length of NFFT, for example: the window function may be a Blackman window; $y_2^{Test}(n_{rnd}^k:(n_{rnd}^k+NFFT-1))$ denotes a signal of length NFFT which is randomly intercepted from $y_2^{Test}$; $n_{rnd}^k$ is a random positive integer uniformly distributed in a value range [1, TestSize]; and K is the number of times of random interceptions; and "∘" denotes dot multiplication.

The training of the AI-DPD integrated scheme system includes, but is not limited to, the following sub-steps:

At step 2-1: in accordance with the element indexes n (n=1, 2, . . . , TrainSize), the training set $\{x_2^{Train}(n)\}_{n=1}^{TrainSize}$ is continuously input to the system by means of organization in the form of a complex vector $\vec{X}_2^{Train}$ formed by combining a history element and a current element each time as follows:

$$\vec{X}_2^{Train} = [x_2^{Train}(n-M_2), \ldots, x_2^{Train}(n-m), \ldots, x_2^{Train}(n-1), x_2^{Train}(n)] \quad (2\text{-}40)$$

where $M_2$ is the power amplifier memory effect parameter, $0 \leq M_2 \leq TrainSize$.

At step 2-2: the complex vector $\vec{X}_2^{Train}$ is passed through the complex neural network unit (ComplexNN) to obtain the predistorted complex correction vector $\vec{Z}_2^{Train}$, where the relationship between the input and output of this unit is shown as the following expression:

$$\vec{Z}_2^{Train} = [z_2^{Train}(n-M_2), \ldots, z_2^{Train}(n-m), \ldots, z_2^{Train}(n-1), z_2^{Train}(n)] \quad (2\text{-}41)$$

$$\vec{Z}_2^{Train} = ComplexNN(\vec{X}_2^{Train}) \quad (2\text{-}42)$$

At step 2-3: the complex vector $\vec{X}_2^{Train}$ is passed through a predistortion multiplier (DPD multiplier) unit to obtain the predistortion corrected complex vector $\vec{S}_2^{Train}$, where the relationship between the input and output of this unit is shown as the following expression:

$$\vec{S}_2^{Train} = [s_2^{Train}(n-M_2), s_2^{Train}(n-M_2+1), \ldots, s_2^{Train}(n-1), s_2^{Train}(n)] \quad (2\text{-}43)$$

$$\vec{S}_2^{Train} = \vec{X}_2^{Train} \circ \vec{Z}_2^{Train} \quad (2\text{-}44)$$

where "∘" denotes dot multiplication.

At step 2-4: the predistortion corrected complex vector $\vec{S}_2^{Train}$ is input to the radio frequency power amplifier output feedback circuit to obtain the output $y_2^{Train}$ which is shown as the following expression:

$$y_2^{Train} = PA(\vec{S}_2^{Train}) \quad (2\text{-}45)$$

The power amplifier (PA) unit in the radio frequency power amplifier output feedback circuit may be any actual power amplifier product; in other words, this embodiment has no restrictions on the nonlinear characteristics of the power amplifier model.

At step 2-5: the loss function of the complex neural network is calculated based on the $y_2^{Train}$ and the complex vector $\vec{X}_2^{Train}$. Since there are many variations of the additional regularization term, only as a simple example, a loss function expression is provided below for illustration:

$$E_2^{Train} = \frac{1}{2} \sum_{n=1}^{TrainSize} |y_2^{Train}(n) - x_2^{Train}(n)|^2 \quad (2\text{-}46)$$

At step 2-6: the partial derivative or sensitivity $$\delta_{y_2^{Train}}$$

of the loss function $E_2^{Train}$ with respect to the power amplifier output feedback quantity $y_2^{Train}$ is calculated according to the following expression (2-47):

$$\delta_{y_2^{Train}} \triangleq \frac{\partial E_2^{Train}}{\partial y_2^{Train}(n)} = y_2^{Train}(n) - x_2^{Train}(n) \quad (2\text{-}47)$$

At step 2-7: the following intermediate partial derivative or sensitivity $\delta_{l,m}$ is calculated according to the above sensitivity $$\delta_{y_2^{Train}}$$

based on the following expression (2-48):

$$\delta_{l,m} = conj(c_{l,m}) \cdot \delta_{y_2^{Train}} \quad (2\text{-}48)$$

where $c_{l,m}$ is a complex coefficient obtained using a least squares algorithm according to a memory polynomial model and based on a complex vector in the training set and an output obtained by inputting the complex vector to the radio frequency power amplifier output feedback circuit; and conj(●) denotes taking a conjugate of a complex number.

At step 2-8: the partial derivative or sensitivity $$\delta_{s_2^{Train}}$$

of the loss function $E_2^{Train}$ with respect to each element of the predistortion corrected complex vector $\vec{S}_2^{Train}$ according to the above sensitivity $\delta_{l,m}$ based on the following expression (2-49):

$$\delta_{s_2^{Train}} \triangleq \frac{\partial E_2^{Train}}{\partial s_2^{Train}} = \sum_{l=1}^{L_2}(A_{l,m} \cdot \delta_{l,m}) + [s_2^{Train} \cdot \text{real}\,(s_2^{Train})] \cdot \quad (2\text{-}49)$$

$$\sum_{l=1}^{L_2}[B_{l,m} \cdot \text{real}\,(\delta_{l,m})] + [s_2^{Train} \cdot \text{imag}(s_2^{Train})] \cdot \sum_{l=1}^{L_2}[B_{l,m} \cdot \text{imag}(\delta_{l,m})]$$

$$\begin{cases} A_{l,m} \triangleq |s_2^{Train}|^{l-1} \\ B_{l,m} \triangleq (l-1) \cdot |s_2^{Train}|^{l-3} \end{cases} (l=1,2,\ldots,L_2; m=0,1,2,\ldots,M_2) \quad (2\text{-}50)$$

In order to avoid the extreme value case where the input is 0+0j, in response to there being a zero element (i.e., 0+0j) in the predistortion corrected complex vector $\vec{S}_1^{Train}$, $B_{l,m}$ defined by expression (2-50) above is set to 0.

At step 2-9: the partial derivative or sensitivity $$\delta_{z_2^{Train}}$$

of the loss function $E_2^{Train}$ with respect to each element of the predistorted complex correction vector $\vec{Z}_2^{Train}$ according to the above sensitivity $$\delta_{s_2^{Train}}$$

based on the following expression (2-51):

$$\delta_{z_2^{Train}} \triangleq \frac{\partial E_2^{Train}}{\partial z_2^{Train}} = conj \cdot (x_2^{Train}) \cdot \delta_{s_2^{Train}} \quad (2\text{-}51)$$

At step 2-10: according to the sensitivity $$\delta_{z_2^{Train}}$$

described above, in the reverse order of the forward operation of the complex neural network units, the partial derivatives or sensitivities of the loss function $E_2^{Train}$ with respect to the weight parameter and the bias parameter of each layer therein are calculated sequentially, including, but not limited to, the following sub-steps:

At step 2-10-1: in response to the current to-be-calculated layer being a full-connected layer, the partial derivative or sensitivity of the loss function $E_2^{Train}$ with respect to the complex weight parameter $W_{1,uv}^{Train,jk}$ and the complex bias parameter $b_{2,v}^{Train,k}$ of that layer are calculated according to the following expressions (2-52) and (2-53), respectively:

$$\delta_{W_{2,uv}^{Train,jk}} \triangleq \frac{\partial E_2^{Train}}{\partial W_{2,uv}^{Train,jk}} = conj(x_{2,u}^{Train,j}) \cdot conj(f'(x_{2,u}^{Train,j})) \cdot \delta_{x_{2,v}^{Train,k}} \quad (2\text{-}52)$$

$$\delta_{b_{2,v}^{Train,k}} \triangleq \frac{\partial E_2^{Train}}{\partial b_{2,v}^{Train,k}} = \delta_{x_{2,v}^{Train,k}} \quad (2\text{-}53)$$

where $W_{2,uv}^{Train,jk}$ denotes a complex weight of the connection from a uth neuron in a jth layer to a with neuron in a kth layer in the network; $x_{2,u}^{Train,j}$ and $x_{2,v}^{Train,k}$ denote output complex vectors of the uth neuron of the jth layer and the vth neuron of the kth layer in the network, respectively; and η'(●) denotes a derivative of the neuron activation function with respect to an input signal.

At step 2-10-2: in response to the current to-be-calculated layer (set as the kth layer) being a convolutional layer, the partial derivatives or sensitivities of the loss function $E_2^{Train}$ with respect to the complex weight $\vec{\Lambda}_{2,q}^{Train,k}$ and the complex bias $b_{2,q}^{Train,k}$ of the qth (q=1, 2, . . . , Q) convolution kernel of that layer are calculated according to the following expressions (2-54) and (2-55), respectively:

$$\vec{\delta}_{\vec{\Lambda}_{2,q}^{Train,k}} \triangleq \frac{\partial E_2^{Train}}{\partial \vec{\Lambda}_{2,q}^{Train,k}} = \sum_{p=1}^{P} Conv\left(Fliplr\left(conj(\vec{X}_{2,q}^{Train,j})\right), \vec{\delta}_{\vec{X}_{2,q}^{Train,k}}\right) \quad (2\text{-}54)$$

$$\delta_{b_{2,q}^{Train,k}} \triangleq \frac{\partial E_2^{Train}}{\partial b_{2,q}^{Train,k}} = \sum_{v=1}^{V} \delta_{x_{2,q,v}^{Train,k}} \quad (2\text{-}55)$$

where $\vec{X}_{2,p}^{Train,j}$ denotes a pth (p=1, 2, . . . , P) complex vector which is output from the previous layer (the jth layer) of this convolutional layer; $\vec{X}_{2,q}^{Train,k}$ denotes a qth complex vector which is output by the current convolutional layer (the kth layer);

$$\vec{\delta}_{\vec{X}_{2,q}^{Train,k}} = \left[\delta_{x_{2,q,1}^{Train,k}}, \ldots, \delta_{x_{2,q,v}^{Train,k}}, \ldots, \delta_{x_{2,q,V}^{Train,k}}\right]$$

denotes the partial derivative or sensitivity of the loss function $E_2^{Train}$ with respect to the above $\vec{X}_{2,q}^{Train,k}$; Conv (●) denotes the convolution operation; and Fliplr(●) denotes position flipping of the input vector.

At step 2-11: parameter updating is performed according to the sensitivity of the loss function $E_2^{Train}$ calculated for each layer with respect to the weight parameter and the bias parameter, where since there are various parameter updating approaches for different training algorithms, only a simple example is provided below for illustration:

$$W_{2,uv}^{Train,jk}(n) = W_{2,uv}^{Train,jk}(n-1) - \alpha_{2,uv}^{Train,jk} \cdot \delta_{W_{2,uv}^{Train,jk}} \quad (2\text{-}56)$$

-continued $$b_{2,y}^{Train,k}(n) = b_{2,y}^{Train,k}(n-1) - \alpha_{2,y}^{Train,k} \cdot \delta_{b_{2,y}^{Train,k}} \quad (2\text{-}57)$$

At step 3: performance statistics of the AI-DPD integrated scheme system based on the test set.

At step 3-1: in accordance with the element index n (n=1, 2, . . . , TestSize), the test set $\{x_2^{Test}(n)\}_{n=1}^{TestSize}$ is continuously input to the system by means of organization in the form of a complex vector $\vec{X}_2^{Test}$ formed by combining a history element and a current element each time as follows:

$$\vec{X}_2^{Test} = [x_2^{Test}(n-M_2), \ldots, x_2^{Test}(n-m), \ldots, x_2^{Test}(n-1), x_2^{Test}(n)] \quad (2\text{-}58)$$

At step 3-2: the complex vector $\vec{X}_2^{Test}$ is passed through the complex neural network (ComplexNN) unit to obtain the predistorted complex correction vector $\vec{Z}_2^{Test}$ as follows:

$$\vec{Z}_2^{Test} = [z_2^{Test}(n-M_2), \ldots, z_2^{Test}(n-m), \ldots, z_2^{Test}(n-1), z_2^{Test}(n)] \quad (2\text{-}59)$$

$$\vec{Z}_2^{Test} = \text{ComplexNN}(\vec{X}_2^{Test}) \quad (2\text{-}60)$$

At step 3-3: the complex vector $\vec{X}_2^{Test}$ is passed through the predistortion multiplier (DPD multiplier) unit to obtain the predistortion corrected complex vector $\vec{S}_2^{Test}$:

$$\vec{S}_2^{Test} = [s_2^{Test}(n-M_2), s_2^{Test}(n-M_2+1), \ldots, s_2^{Test}(n-1), s_2^{Test}(n)] \quad (2\text{-}61)$$

$$\vec{S}_2^{Train} = \vec{X}_2^{Train} \circ \vec{Z}_2^{Train} \quad (2\text{-}62)$$

At step 3-4: the predistortion corrected complex vector $\vec{S}_2^{Test}$ is input to the radio frequency power amplifier output feedback circuit to obtain the output $y_2^{Test}$:

$$y_2^{Test} = \text{PA}(\vec{S}_2^{Test}) \quad (2\text{-}63)$$

At step 3-5: according to the above $y_2^{Test}$ and the $x_2^{Test}$ of the test set, the generalization EVM performance (GEVM) and generalization ACLR performance (GACLR) of the system based on the test set are statistically calculated based on the above expressions (2-36) and (2-37).

At step 3-6: in response to the GEVM and GACLR meeting the set indicator requirements, the training of the AI-DPD integrated scheme system is stopped; otherwise, the process returns to the execution of all steps in step 2 and a new round of training is started.

Table 1 shows a generalization performance effect table provided in an embodiment of the present disclosure. As shown in Table 1, the generalization EVM performance is guaranteed by the predistortion system provided in the present disclosure. The complex MLP network includes 3 hidden layers each of which includes 5 neurons; the nonlinear order P=5; the memory effect size M=6; and the size of the complex vector which is input to the predistortion system each time=P×(M+1)=35. The training set includes 39,320 complex vectors; the validation set includes 13,107 complex vectors; and the test set includes 13,105 complex vectors.

TABLE 1

A generalization performance effect table provided in an embodiment of the present disclosure

| Various types of power amplifier data sets | Generalization EVM performance (dB) | | Generalization ACLR performance (dBc) | | |
|---|---|---|---|---|---|
| | Passing through the power amplifier only | Output from the predistortion system | Raw input | Passing through the power amplifier only | Output from the predistortion system (i.e., the integrated overall output) |
| PA-0 | −16.014 | −43.775 | −78.6455 | −28.5536 | −56.7880 |
| PA-1 | 5.365 | −41.961 | −46.0685 | −13.768 | −44.9519 |
| PA-2 | 4.262 | −55.124 | −49.0451 | −4.3126 | −48.8717 |
| PA-3 | 2.602 | −69.650 | −37.8351 | −13.0234 | −37.8307 |
| PA-4 | 0.979 | −87.384 | −45.3549 | −16.7001 | −45.3548 |
| PA-5 | 1.306 | −71.336 | −42.2206 | −15.1553 | −42.1995 |

Figure 4:
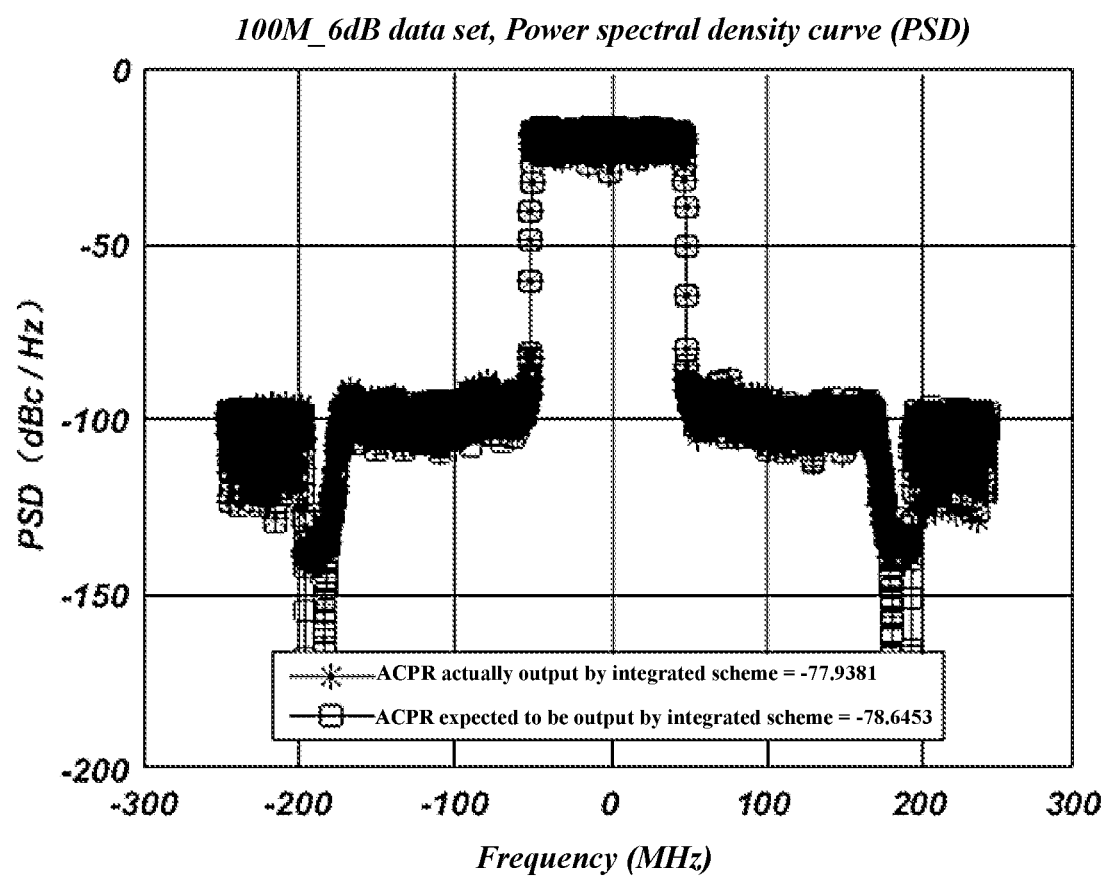
FIG. 4 is a performance effect diagram of a generalization adjacent channel leakage ratio obtained by an embodiment of the present disclosure.
Figure 5:
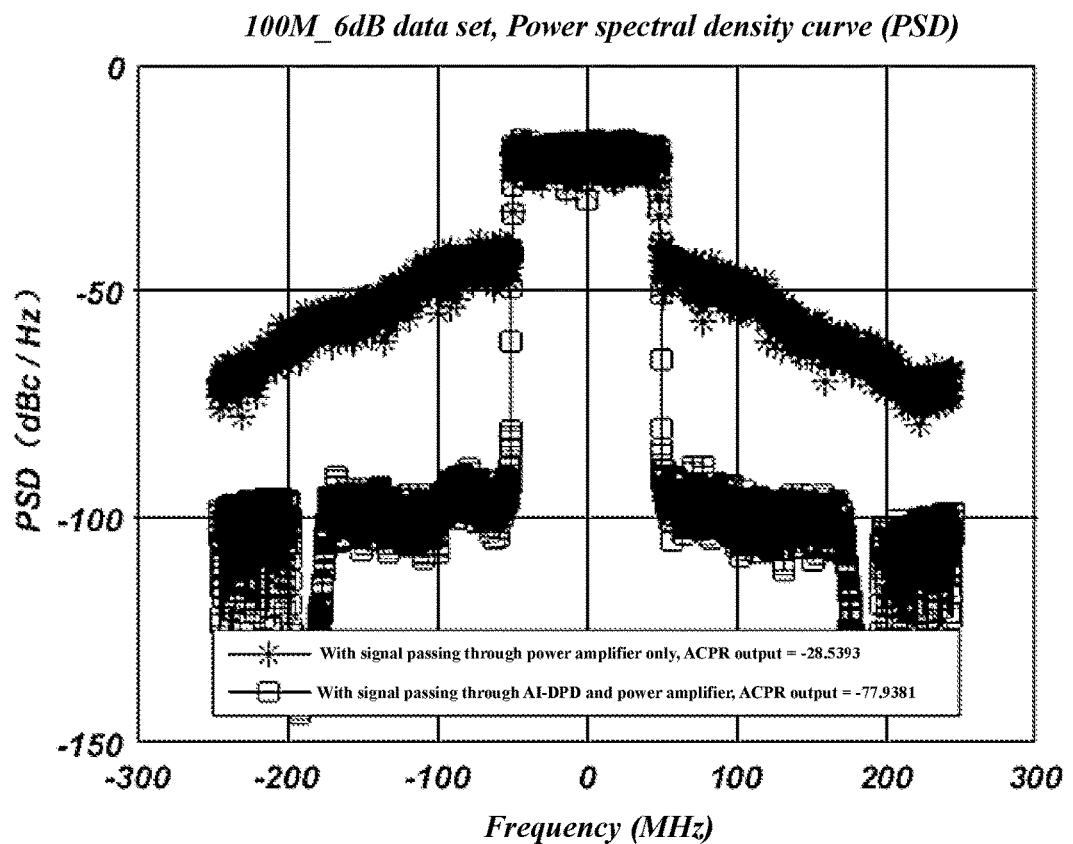
FIG. 5 is an improved effect diagram of a generalization adjacent channel leakage ratio obtained by an embodiment of the present disclosure.

FIG. 4 illustrates a performance effect diagram of the generalization adjacent channel leakage ratio obtained in an embodiment of the present disclosure. As shown in FIG. 4, the generalization adjacent channel leakage ratio actually output by the integrated method, i.e., the predistortion system provided in the present disclosure has a small deviation from the generalization adjacent channel leakage ratio which is expected to be output. FIG. 5 illustrates an improved effect diagram of a generalization adjacent channel leakage ratio obtained by an embodiment of the present disclosure. As shown in FIG. 5, the predistortion system provided in the present disclosure has an improved generalization adjacent channel leakage ratio compared to the system in which the signal only passes through the power amplifier.

Different steps of the above method may be implemented by a programming computer. Here, some implementations also include a machine-readable or computer-readable program storage device (e.g., a digital data storage medium) and encoding machine-executable or computer-executable program instructions, where the instructions are used to perform some or all of the steps of the method described above. For example, the program storage device may be a digital memory, a magnetic storage medium (e.g., a magnetic disk and a tape), hardware, or an optically readable digital data storage medium. The implementations also include a programming computer that performs the steps of the method described above.

In an illustrative implementation, The present disclosure provides a predistortion system of which the schematic diagram is as shown in FIG. 3b. The predistortion system is capable of performing the predistortion method provided in the embodiments of the present disclosure, the predistortion system including: a predistortion multiplier, a complex neural network, and a radio frequency power amplifier output feedback circuit, wherein a first input end of the predistortion multiplier is an input end of the predistortion system and is connected to a first input end and a second input end of the complex neural network, an output end of the predistortion multiplier is connected to an input end of the radio frequency power amplifier output feedback circuit, an output end of the radio frequency power amplifier output feedback circuit is an output end of the predistortion system, and the output end of the radio frequency power amplifier output feedback circuit is connected to the second input end of the complex neural network; and an output end of the complex neural network is connected to a second input end of the predistortion multiplier.

In an embodiment, the radio frequency power amplifier output feedback circuit comprises: a digital-to-analog converter unit, a radio frequency modulation unit, a power amplifier unit, an analog-to-digital converter unit, and a radio frequency demodulation unit.

The output end of the predistortion multiplier may be connected to an input end of the power amplifier unit of the radio frequency power amplifier output feedback circuit through the digital-to-analog converter unit (i.e., D/A) and the radio frequency modulation unit of the radio frequency power amplifier output feedback circuit, and an output end of the power amplifier unit may be connected to the second input end of the complex neural network through the radio frequency demodulation unit and the analog-to-digital converter unit (i.e. A/D).

The predistortion system provided in this embodiment is configured to implement the predistortion method provided in the embodiments of the present disclosure, and the predistortion system provided in this embodiment implements similar principles and technical effects as the predistortion method provided in the embodiments of the present disclosure, and will not be described herein.

In an illustrative implementation, The present disclosure provides a predistortion system of which the schematic diagram is as shown in FIG. 3a. The predistortion system can perform the predistortion method provided in the embodiments of the present disclosure, the predistortion system including: a predistortion multiplier, a complex neural network, a radio frequency power amplifier output feedback circuit, a first real-time power normalization unit, and a second real-time power normalization unit, wherein an input end of the first real-time power normalization unit is an input end of the predistortion system, an output end of the first real-time power normalization unit is connected to a first input end of the predistortion multiplier, a first input end of the complex neural network, and a second input end of the complex neural network, an output end of the predistortion multiplier is connected to an input end of the radio frequency power amplifier output feedback circuit, an output end of the radio frequency power amplifier output feedback circuit is an output end of the predistortion system, the output end of the radio frequency power amplifier output feedback circuit is connected to an input end of the second real-time power normalization unit, an output end of the second real-time power normalization unit is connected to the second input end of the complex neural network, and an output end of the complex neural network is connected to a second input end of the predistortion multiplier.

In an embodiment, the radio frequency power amplifier output feedback circuit comprises: a digital-to-analog converter unit, a radio frequency modulation unit, a power amplifier unit, an analog-to-digital converter unit, and a radio frequency demodulation unit.

An input end of the digital-to-analog converter unit is an input end of the radio frequency power amplifier output feedback circuit, an output end of the digital-to-analog converter unit is connected to an input end of the radio frequency modulation unit, an output end of the radio frequency modulation unit is connected to an input end of the power amplifier unit, an output end of the power amplifier unit is connected to the input end of the radio frequency demodulation unit, the output end of the radio frequency demodulation unit is connected to an input end of the analog-to-digital converter unit, and an output end of the analog-to-digital converter unit is the output end of the radio frequency power amplifier output feedback circuit.

The predistortion system provided in this embodiment is configured to implement the predistortion method provided in the embodiments of the present disclosure, and the predistortion system provided in this embodiment implements similar principles and technical effects as the predistortion method provided in the embodiments of the present disclosure, and will not be described herein.

Figure 6:
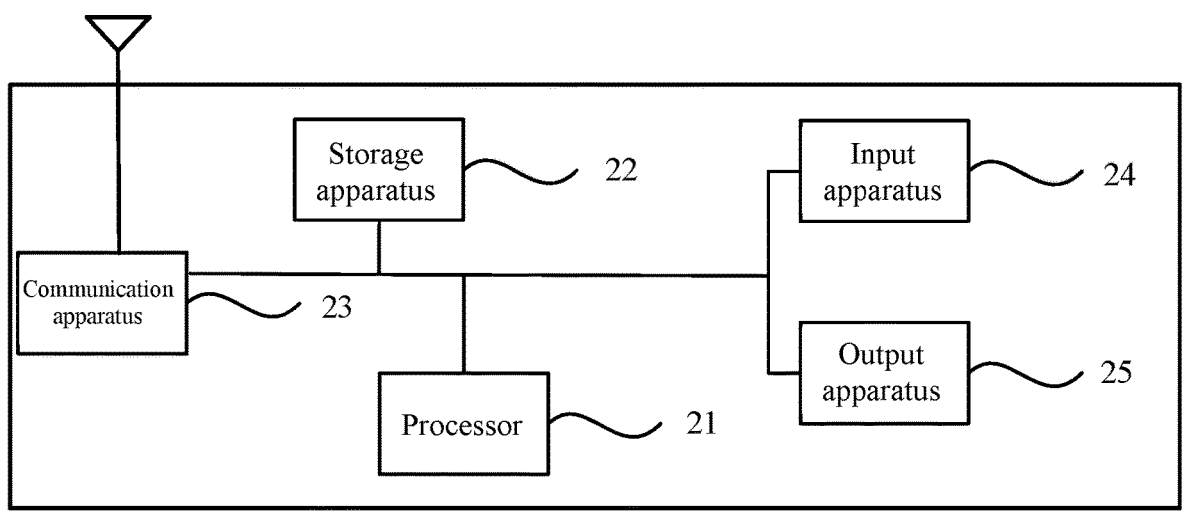
FIG. 6 is a schematic diagram of a device provided by an embodiment of the present disclosure.

In an illustrative implementation, a further embodiment of the present disclosure provides a device, of which a schematic diagram is shown in FIG. 6. As shown in FIG. 6, the device provided by the present disclosure includes at least one processor 21 and a storage apparatus 22. The device may be provided with one or more processors 21, while one processor 21 is shown as an example in FIG. 6. The storage apparatus 22 is configured to store at least one program, where the at least one program, when executed by the at least one processor 21, causes the at least one processor 21 to implement the method according to the embodiment of the present disclosure.

The device further includes: a communication apparatus 23, an input apparatus 24 and an output apparatus 25.

The processor 21, the storage apparatus 22, the communication apparatus 23, the input apparatus 24, and the output apparatus 25 in the device may be connected by a bus or other means. In FIG. 6, the connection is realized by a bus.

The input apparatus 24 may be configured to receive input digital or character information and generate key signal inputs related to user settings and function control of the device. The output apparatus 25 may include a display device such as a display screen.

The communication apparatus 23 may include a receiver and a transmitter. The communication apparatus 23 is configured to transmit and receive information according to control of the processor 21.

As a computer-readable storage medium, the storage apparatus 22 may be configured to store a software program, a computer-executable program and a module, for example, program instructions/the predistortion system corresponding to the method according to the embodiment of the present disclosure. The storage apparatus 22 may include a storage program area and a storage data area, where the storage program area may store an operating system and application program(s) required by at least one function, and the storage data area may store data created according to the use of the device, etc. In addition, the storage apparatus 22 may include a high-speed random access memory and a non-volatile memory, for example, at least one magnetic disk storage device, a flash memory device, or another non-volatile solid-state storage device. In some examples, the storage apparatus 22 may include memories remotely located with respect to the processor 21, and these remote memories may be connected to the device via a network. Examples of the above-mentioned network include the Internet, an intranet, a local area network, a mobile communication network, and a combination thereof.

A further embodiment of the present disclosure provides a storage medium storing a computer program which, when executed by a processor, causes the processor to implement any of the methods of the present disclosure, the storage medium storing a computer program which, when executed by a processor, implements the predistortion method provided in an embodiment of the present disclosure which is applicable to a predistortion system including a predistortion multiplier, a complex neural network, and a radio frequency power amplifier output feedback circuit, the method including: inputting a training complex vector to the predistortion system to obtain a complex scalar corresponding to the training complex vector, which is output by the predistortion system; training the predistortion system based on the training complex vector and the complex scalar until a generalization error vector magnitude and a generalization adjacent channel leakage ratio corresponding to the predistortion system meet set requirements; and inputting a service complex vector to the trained predistortion system to obtain a predistortion corrected complex scalar.

The computer storage medium of this embodiment may be any combination of one or more computer-readable media. The computer-readable medium may be a computer-readable signal medium or a computer-readable storage medium. For example, the computer-readable storage medium may be, but is not limited to, electrical, magnetic, optical, electromagnetic, infrared, or semiconductor system, an apparatus or a device, or any combination thereof. Examples of the computer-readable storage medium (a non-exhaustive list thereof) include: an electrical connection with one or more wires, a portable computer disk, a hard disk, a Random Access Memory (RAM), a Read-Only Memory (ROM), an erasable programmable read-only memory, EPROM), a flash memory, an optical fiber, a Compact Disc Read-Only Memory (CD-ROM), an optical storage device, a magnetic storage device or any proper combination thereof. The computer-readable storage medium may be any tangible medium including or storing a program, and the program may be used by or used in combination with an instruction execution system, apparatus or device.

The computer-readable signal medium may include a data signal propagated in a baseband or propagated as a part of a carrier, and carries computer-readable program code. Such a propagated data signal may be in multiple forms, including but not limited to: an electromagnetic signal, an optical signal, or any proper combination thereof. The computer-readable signal medium may alternatively be any computer-readable storage medium other than the computer-readable medium. The computer-readable storage medium may send, propagate or transmit a program used by or used in combination with an instruction execution system, apparatus or device.

The program code included in the computer-readable medium may be transmitted by any suitable medium, including but not limited to: radio, an electric cable, an optical-fiber cable, Radio Frequency (RF), or any proper combination thereof.

Computer program code for executing the operations in the present disclosure may be compiled by using one or more program design languages or a combination thereof. The programming languages include object oriented programming languages, such as Java, Smalltalk, and C++, and conventional procedural programming languages, such as C or similar programming languages. The program code may be executed fully on a user computer, executed partially on a user computer, executed as an independent software package, executed partially on a user computer and partially on a remote computer, or executed fully on a remote computer or a server. In a circumstance in which a remote computer is involved, the remote computer may be connected to a user computer via any type of network, including a Local Area Network (LAN) or a Wide Area Network (WAN), or may be connected to an external computer (for example, connected via the Internet by using an Internet service provider).

The term "device" (such as terminal device) covers any suitable type of wireless user equipment, such as mobile phones, portable data processing equipment, portable web browsers or vehicle-mounted mobile stations.

Generally speaking, various embodiments of the present disclosure may be implemented in hardware or dedicated circuits, software, logic or any combination thereof. For example, some aspects may be implemented in hardware, while other aspects may be implemented in firmware or software that may be executed by a controller, a microprocessor or another computing device. However, the present disclosure is not limited thereto.

Embodiments of the present disclosure may be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure may represent program steps, or may represent interconnected logic circuits, modules and functions, or may represent a combination of program steps and logic circuits, modules and functions. The computer program may be stored in a memory. The memory may be of any type which is suitable for a local technical environment and may be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A predistortion method performed by a predistortion system which comprises a predistortion multiplier, a complex neural network, and a radio frequency power amplifier output feedback circuit, wherein an output end of the complex neural network is connected to an input end of the predistortion multiplier, an output end of the predistortion multiplier is connected to an input end of the radio frequency power amplifier output feedback circuit, an output end of the radio frequency power amplifier output feedback circuit is an output end of the predistortion system, the method comprising:
   outputting a complex scalar corresponding to the training complex vector based on an inputted training complex vector;
   initializing a system parameter of the predistortion system;
   inputting complex vectors in the training set to the predistortion system in accordance with element indexes, wherein a size of a complex vector which is input each time is determined based on a power amplifier memory effect parameter of the predistortion system, and
   a complex vector which is input to the predistortion system each time is obtained by combining a history element value and a current element in the training set;

inputting an output of the radio frequency power amplifier output feedback circuit in the predistortion system to the complex neural network after passing it through a second real-time power normalization unit further comprised in the predistortion system;

or inputting an output of the radio frequency power amplifier output feedback circuit in the predistortion system directly to the complex neural network;

determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network;

updating, according to the determined partial derivatives or sensitivities for each layer within the complex neural network, the weight parameter and the bias parameter of the each layer;

testing the predistortion system based on a test set to obtain a generalization error vector magnitude and a generalization adjacent channel leakage ratio corresponding to the predistortion system meet set requirements; and completing training of the predistortion system in response to values corresponding to the generalization error vector magnitude and the generalization adjacent channel leakage ratio being greater than or equal to their respective set thresholds, and continuing the training of the trained predistortion system based on the training set in response to the values corresponding to the generalization error vector magnitude and the generalization adjacent channel leakage ratio being less than their respective set thresholds; and inputting a service complex vector to the trained predistortion system to obtain a predistortion corrected complex scalar;

wherein the training set and the test set are obtained based on splitting of a normalized complex vector, the normalized complex vector being an output of a first real-time power normalization unit further comprised in the predistortion system which is obtained by inputting the training complex vector to the first real-time power normalization unit; or the training set and the test set are obtained based on splitting of the training complex vector, wherein an expression of a complex vector which is input to the predistortion system each time is as follows:

$$\vec{X}_1^{Train}=[x_1^{Train}(n-M_1), \ldots, x_1^{Train}(n-m), \ldots, x_1^{Train}(n-1), x_1^{Train}(n)],$$

wherein $\vec{X}_1^{Train}$ is the complex vector which is input to the predistortion system each time, $M_1$ is the power amplifier memory effect parameter, $0 \leq M_1 \leq TrainSize$, TrainSize is a size of the training set, $x_1^{Train}(n)$ is an nth element in the training set, $x_1^{Train}(n)$ is the current element, m is an integer greater than 1 and less than $M_1$, $x_1^{Train}(n-1)$, $x_1^{Train}(n-m)$ and $x_1^{Train}(n-M_1)$ are an (n−1)th element, an (n−m)th element, and an (n−M₁)th element in the training set, respectively, and $x_1^{Train}(n-1)$, $x_1^{Train}(n-m)$ and $x_1^{Train}(n-M_1)$ are all history elements.

2. The method of claim 1, wherein the predistortion system is trained using a complex error back propagation algorithm.

3. The method of claim 1, wherein elements in the normalized complex vector are determined through calculation expressions as follows:

$$x_1(i) = \frac{x_{1,raw}(i)}{\sqrt{\overline{P_{x_1}}(n)}}; \text{ and}$$

$$\overline{P_{x_1}}(n) = \frac{1}{n}\sum_{d=1}^{1}|x_{1,raw}(d)|^2,$$

wherein $x_1(i)$ denotes an ith element in the normalized complex vector, $x_{1,raw}(n)$ denotes an nth element in the training complex vector, and $x_{1,raw}(d)$ denotes a dth element in the training complex vector.

4. The method of claim 1, wherein initializing a system parameter of the predistortion system comprises:

completing initialization of each layer in the complex neural network according to a layer type corresponding to the each layer.

5. The method of claim 4, wherein completing initialization of each layer in the complex neural network according to a layer type corresponding to the each layer comprises:

initializing a weight parameter and a bias parameter of each layer in the complex neural network according to a distribution type and a distribution parameter of the each layer.

6. The method of claim 1, wherein a relationship between a complex vector which is input to the complex neural network in the predistortion system and a correction vector which is output by the complex neural network is as follows:

$$\vec{Z}_1^{Train}=\text{ComplexNN}(\vec{X}_1^{Train}),$$

wherein $\vec{Z}_1^{Train}=[z_1^{Train}(n-M_1), \ldots, z_1^{Train}(n-m), \ldots, z_1^{Train}(n-1), z_1^{Train}(n)]$, $\vec{Z}_1^{Train}$ is the correction vector, $z_1^{Train}(n)$, $z_1^{Train}(n-1)$, $z_1^{Train}(n-m)$ and $z_1^{Train}(n-M_1)$ are an nth element, an (n−1)th element, an (n−m)th element, and an (n−M₁)th element in the correction vector, respectively, and ComplexNN denotes a composite function of layer-by-layer operation functions within the complex neural network;

a relationship among a complex vector which is input to the predistortion multiplier in the predistortion system, the correction vector, and an output of the predistortion multiplier is as follows:

$$\vec{S}_1^{Train}=\vec{X}_1^{Train} \circ \vec{Z}_1^{Train},$$

wherein $\vec{S}_1^{Train}=[s_1^{Train}(n-M_1), s_1^{Train}(n-M_1+1), \ldots, s_1^{Train}(n-1), s_1^{Train}(n))]$, $\vec{S}_1^{Train}$ is a complex vector which is output by the predistortion multiplier, $s_1^{Train}(n)$, $s_1^{Train}(n-1)$, $s_1^{Train}(n-M_1+1)$, and $s_1^{Train}(n-M_1)$ are an nth element, an (n−1)th element, an (n−M+1)th element, and an (n−M₁)th element in the complex vector which is output by the predistortion multiplier, $\vec{X}_1^{Train}$ is a complex vector which is input to the predistortion multiplier, and "∘" denotes dot multiplication;

a relationship between the output of the predistortion multiplier and the output of the radio frequency power amplifier output feedback circuit is as follows:

$$y_{1,raw}^{Train}=\text{PA}(\vec{S}_1^{Train}),$$

wherein $y_{1,raw}^{Train}$ is the output of the radio frequency power amplifier output feedback circuit, and PA denotes a processing function of the radio frequency power amplifier output feedback circuit with respect to an input signal; and in the case where the predistortion system comprises the second real-time power normalization unit, a relationship between an input and an output of the second real-time power normalization unit is as follows:

$$y_1^{Train}(i) = \frac{y_{1,raw}^{Train}(i)}{\sqrt{\overline{P}_{y_1}^{Train}(n)}}; \text{ and}$$

$$\overline{P}_{y_1}^{Train}(n) = \frac{1}{D}\sum_{d=1}^{n}|y_{1,raw}^{Train}(d)|^2,$$

wherein $y_1^{Train}(i)$ is an ith output of the second real-time power normalization unit, $y_{1,raw}^{Train}(i)$ is an ith input of the second real-time power normalization unit, n is a positive integer, d is a positive integer greater than or equal to 1 and less than or equal to n, and $y_{1,raw}^{Train}(d)$ is a dth output of the radio frequency power amplifier output feedback circuit.

7. The method of claim 1, wherein determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network comprises:

determining the loss function of the complex neural network based on a feedback quantity of the radio frequency power amplifier output feedback circuit and the complex vector which is input to the complex neural network;

determining a partial derivative or sensitivity of the loss function with respect to each element in the correction vector which is output by the complex neural network;

determining, according to the partial derivative or sensitivity for each element in the correction vector, partial derivatives or sensitivities of the loss function with respect to a weight parameter and a bias parameter of each layer within the complex neural network; and updating, based on the partial derivatives or sensitivities for the weight parameter and the bias parameter of each layer, the weight parameter and the bias parameter of the each layer.

8. The method of claim 7, wherein the loss function is determined by means of calculation through a calculation expression as follows:

$$E_1^{Train} = \frac{1}{2}\sum_{n=1}^{TrainSize}|y_1^{Train}(n) - x_1^{Train}(n)|^2,$$

wherein $E_1^{Train}$ is the loss function.

9. The method of claim 7, wherein a calculation expression for the partial derivative or sensitivity for each element in the correction vector is as follows:

$$\delta_{z_1^{Train}} \triangleq \frac{\partial E_1^{Train}}{\partial z_1^{Train}} = conj(x_1^{Train}) \cdot \delta_{s_1^{Train}},$$

wherein $$\delta_{z_1^{Train}}$$

is the partial derivative or sensitivity for each element in the correction vector, $$\delta_{s_1^{Train}}$$

is a partial derivative or sensitivity of the loss function with respect to each element in a complex vector which is output by the predistortion multiplier, and conj(•) denotes taking a conjugate of a complex number; and $$\delta_{s_1^{Train}}$$

is determined by means of calculation through a calculation expression as follows:

$$\delta_{s_1^{Train}} \triangleq \frac{\partial E_1^{Train}}{\partial s_1^{Train}} = \sum_{l=1}^{L_1}(A_{l,m} \cdot \delta_{l,m}) + [s_1^{Train} \cdot \text{real}(s_1^{Train})] \cdot$$

$$\sum_{l=1}^{L_1}[B_{l,m} \cdot \text{real}(\delta_{l,m})] + [s_1^{Train} \cdot \text{imag}(s_1^{Train})] \cdot \sum_{l=1}^{L_1}[B_{l,m} \cdot \text{imag}(\delta_{l,m})]$$

wherein $$\begin{cases} A_{l,m} \triangleq |s_1^{Train}|^{l-1} \\ B_{l,m} \triangleq (l-1) \cdot |s_1^{Train}|^{l-3} \end{cases} (l = 1, 2, \ldots, L_1; m = 0, 1, 2, \ldots, M_1), \text{"."}$$

denotes scalar multiplication; and $L_1$ is a nonlinear order parameter of the predistortion system, $s_1^{Train}$ is an element in the complex vector which is output by the predistortion multiplier, real(•) denotes taking a real part, imag(•) denotes taking an imaginary part, and $\delta_{l,m}$ denotes an intermediate partial derivative or sensitivity.

10. The method of claim 9, wherein in the case where the predistortion system does not comprise the second real-time power normalization unit, $\delta_{l,m}$ is determined through a calculation expression as follows:

$$\delta_{l,m} = conj(c_{l,m}) \cdot \delta_{y_1^{Train}};$$

in the case where the predistortion system comprises the second real-time power normalization unit, $\delta_{l,m}$ is determined through a calculation expression as follows:

$$\delta_{l,m} = conj(c_{l,m}) \cdot \delta_{y_{1,raw}^{Train}},$$

wherein $c_{l,m}$ is a complex coefficient obtained using a least squares algorithm according to a memory polynomial model and based on a complex vector in the training set and an output obtained by inputting the complex vector in the training set to the radio frequency power amplifier output feedback circuit;

$$\delta_{y_{1,raw}^{Train}}$$

is a partial derivative or sensitivity of the loss function with respect to a complex scalar which is output by the radio frequency power amplifier output feedback circuit;

$$\delta_{y_{1,raw}^{Train}}$$

is determined by means of calculation through a calculation expression as follows:

$$\delta_{y_{1,raw}^{Train}} \triangleq \frac{\partial E_1^{Train}}{\partial y_{1,raw}^{Train}(n)} = \frac{1}{\sqrt{P_{y_1}^{Train}(n)}} \cdot \delta_{y_1^{Train}},$$

wherein $$\delta_{y_1^{Train}}$$

is a partial derivative or sensitivity of the loss function with respect to the feedback quantity of the radio frequency power amplifier output feedback circuit; and $$\delta_{y_1^{Train}}$$

is determined by means of calculation through a calculation expression as follows:

$$\delta_{y_1^{Train}} \triangleq \frac{\partial E_1^{Train}}{\partial y_1^{Train}(n)} = y_1^{Train}(n) - x_1^{Train}(n).$$

11. The method of claim 7, wherein:
partial derivatives or sensitivities for a weight parameter and a bias parameter of a full-connected layer within the complex neural network are as follows, respectively:

$$\delta_{W_{1,uv}^{Train,jk}} \triangleq \frac{\partial E_1^{Train}}{\partial W_{1,uv}^{Train,jk}} = conj(x_{1,u}^{Train,j}) \cdot conj\left(f'(x_{1,u}^{Train,j})\right) \cdot \delta_{x_{1,v}^{Train,k}}; \text{ and}$$

$$\delta_{b_{1,v}^{Train,k}} \triangleq \frac{\partial E_1^{Train}}{\partial b_{1,v}^{Train,k}} = \delta_{x_{1,v}^{Train,k}},$$

wherein $W_{1,Uv}^{Train,jk}$ denotes a complex weight parameter of a connection from a uth neuron of a jth layer to a vth neuron of a kth layer in the complex neural network, $b_{1,v}^{Train,k}$ denotes a bias parameter of the vth neuron of the kth layer of the complex neural network, and $x_{1,u}^{Train,j}$ and $x_{1,v}^{Train,k}$ denote output complex vectors of the uth neuron of the jth layer and the vth neuron of the kth layer in the complex neural network, respectively;

and $f'(\bullet)$ denotes a derivative of a neuron activation function of the complex neural network with respect to an input signal, $$\delta_{W_{1,uv}^{Train,jk}}$$

is the partial derivative or sensitivity for the weight parameter of the full-connected layer, $$\delta_{b_{1,v}^{Train,k}}$$

is the partial derivative or sensitivity for the bias parameter of the full-connected layer, $$\delta_{x_{1,v}^{Train,k}}$$

is a partial derivative or sensitivity of the loss function with respect to $x_{1,v}^{Train,k}$, and conj($\bullet$) denotes taking a conjugate of a complex number;
partial derivatives or sensitivities for a weight parameter and a bias parameter of a qth convolutional kernel of a convolutional layer within the complex neural network are as follows, respectively:

$$\vec{\delta}_{\vec{\Lambda}_{1,q}^{Train,k}} \triangleq \frac{\partial E_1^{Train}}{\partial \vec{\Lambda}_{1,q}^{Train,k}} = \sum_{p=1}^{P} Conv\left(Fliplr\left(conj(\vec{X}_{1,p}^{Train,j})\right), \vec{\delta}_{\vec{X}_{1,q}^{Train,k}}\right); \text{ and}$$

$$\delta_{b_{1,q}^{Train,k}} \triangleq \frac{\partial E_1^{Train}}{\partial b_{1,q}^{Train,k}} = \sum_{v=1}^{V} \delta_{x_{1,q,v}^{Train,k}},$$

wherein $$\vec{\delta}_{\vec{\Lambda}_{1,q}^{Train,k}}$$

is the partial derivative or sensitivity for the weight parameter of the qth convolutional kernel, $$\delta_{b_{1,q}^{Train,k}}$$

is the partial derivative or sensitivity for the bias parameter of the qth convolutional kernel,
$\vec{X}_{1,p}^{Train,j}$ denotes a pth complex vector which is output by a previous layer for the convolutional layer, i.e., a jth layer of the complex neural network, and
$\vec{X}_{1,q}^{Train,k}$ denotes a qth complex vector which is output by a kth layer of the complex neural network, q=1, 2, . . . , Q, and p=1, 2, . . . , P, wherein Q and P are the numbers of output feature vectors of the kth layer and the jth layer of the complex neural network, respectively, $$\vec{\delta}_{\vec{X}_{1,q}^{Train,k}} = \left[ \delta_{x_{1,q,1}^{Train,k}}, \cdots, \delta_{x_{1,q,v}^{Train,k}}, \cdots, \delta_{x_{1,q,V}^{Train,k}} \right]$$

denotes a partial derivative or sensitivity of the loss function with respect to $\vec{X}_{1,q}^{Train,k}$, Fliplr(●) denotes position flipping of an input vector, and Conv(●) denotes a convolution operation;

or a weight parameter and a bias parameter of a full-connected layer within the complex neural network are updated through expressions as follows:

$$W_{1,uv}^{Train,jk}(n) = W_{1,uv}^{Train,jk}(n-1) - \alpha_{1,uv}^{Train,jk}(n) \cdot \delta_{W_{1,uv}^{Train,jk}}(n); \text{ and}$$

$$b_{1,v}^{Train,k}(n) = b_{1,v}^{Train,k}(n-1) - \alpha_{1,v}^{Train,k}(n) \cdot \delta_{b_{1,v}^{Train,k}}(n),$$

wherein $W_{1,uv}^{Train,jk}(n)$ and $W_{1,uv}^{Train,jk}(n-1)$ denote values of the weight parameter $W_{1,uv}^{Train,jk}$ of the full-connected layer at a current moment and at a previous moment, respectively;

$b_{1,v}^{Train,k}(n)$ and $b_{1,v}^{Train,k}(n-1)$ denote values of the bias parameter $b_{1,v}^{Train,k}$ of the full-connected layer at a current moment and at a previous moment, respectively;

$\alpha_{1,uv}^{Train,jk}(n)$ denotes an update step for the weight parameter $W_{1,uv}^{Train,jk}$ at the current moment; and $\alpha_{1,v}^{Train,k}(n)$ denotes an update step for the bias parameter $b_{1,v}^{Train,k}$ at the current moment.

12. The method of claim 1, wherein testing the trained predistortion system based on a test set to obtain an error vector magnitude and an adjacent channel leakage ratio corresponding to the trained predistortion system comprises:

inputting complex vectors in the test set to the predistortion system in accordance with element indexes,
wherein a size of a complex vector which is input each time is determined based on a power amplifier memory effect parameter of the predistortion system, and
a complex vector which is input to the predistortion system each time is obtained by combining a history element and a current element in the test set; and inputting an output of the radio frequency power amplifier output feedback circuit in the predistortion system to the predistortion system to determine the generalization error vector magnitude and the generalization adjacent channel leakage ratio corresponding to the predistortion system.

13. The method of claim 12, wherein the generalization error vector magnitude and the generalization adjacent channel leakage ratio are determined through calculation expressions as follows, respectively:

$$GEVM_1 = 10 \cdot \log_{10}\left( \frac{\sum_{n=1}^{TestSize} |y_1^{Test}(n) - x_1^{Test}(n)|^2}{\sum_{n=1}^{TestSize} |x_1^{Test}(n)|^2} \right);$$

$$GACLR(y_1^{Test}) = 10 \cdot \log_{10}\left( \frac{\sum_{f=HBW+2GBW}^{2HBW+2GBW} \overline{P}_{y_1^{Test}}(f)}{\sum_{f=0}^{HBW} \overline{P}_{y_1^{Test}}(f)} \right);$$

$$\overline{P}_{y_1^{Test}}^k = \left| FFT(y_1^{Test}(n_{rnd}^k:(n_{rnd}^k + NFFT - 1)) \circ Win_{NFFT}) \right|^2 (k = 1, 2, \ldots, K);$$

and $$\overline{P}_{y_1^{Test}}(f) = \frac{1}{K} \sum_{k=1}^{K} \overline{P}_{y_1^{Test}}^k(f),$$

wherein $GEVM_1$ denotes the generalization error vector magnitude, $GACLR(y_1^{Test})$ denotes the generalization adjacent channel leakage ratio of $y_1^{Test}$, $y_1^{Test}$ denotes a feedback quantity of the radio frequency power amplifier output feedback circuit, $y_1^{Test}(n)$ denotes an nth element feedback quantity of the radio frequency power amplifier output feedback circuit, $x_1^{Test}(n)$ denotes an nth element of a corresponding complex vector in the test set, TestSize denotes a size of the test set, the sum of TestSize and TrainSize is $N_1$, $N_1$ denotes a size of the training complex vector, HBW denotes half of an effective signal bandwidth, GBW denotes half of a guard bandwidth, and NFFT denotes the number of points of the discrete Fourier transform; $Win_{NFFT}$ is a coefficient vector of a window function with a window length NFFT and $y_1^{Test}(n_{rnd}^k:(n_{rnd}^k+NFFT-1))$ denotes a signal of length NFFT which is randomly intercepted from $y_1^{Test}$; $n_{rnd}^k$ is a random positive integer uniformly distributed in a value range [1, TestSize]; and K is the number of times of random interceptions.

14. A predistortion system which performs the predistortion method of claim 1,
wherein
a first input end of the predistortion multiplier is an input end of the predistortion system and is connected to a first input end and a second input end of the complex neural network, and
the output end of the radio frequency power amplifier output feedback circuit is connected to the second input end of the complex neural network; and.

15. The predistortion system of claim 14, wherein the radio frequency power amplifier output feedback circuit comprises:
a digital-to-analog converter unit, a radio frequency modulation unit, a power amplifier unit, an analog-to-digital converter unit, and a radio frequency demodulation unit,
wherein the output end of the predistortion multiplier is connected to an input end of the power amplifier unit through the digital-to-analog converter unit and the radio frequency modulation unit, and
an output end of the power amplifier unit is connected to the second input end of the complex neural network through the radio frequency demodulation unit and the analog-to-digital converter unit.

16. A predistortion system which performs the predistortion method of claim 1, the predistortion system comprising:
a first real-time power normalization unit, and a second real-time power normalization unit,
wherein an input end of the first real-time power normalization unit is an input end of the predistortion system, an output end of the first real-time power normalization unit is connected to a first input end of the predistortion multiplier, a first input end of the complex neural network, and a second input end of the complex neural network, the output end of the radio frequency power amplifier output feedback circuit is connected to an input end of the second real-time power normalization unit, and an output end of the second real-time power normalization unit is connected to the second input end of the complex neural network.

17. A device, comprising:

at least one processor; and a storage apparatus configured to store at least one program, wherein the at least one program, when executed by the at least one processor, causes the at least one processor to implement a predistortion method performed by a predistortion system which comprises a predistortion multiplier, a complex neural network, and a radio frequency power amplifier output feedback circuit, wherein an output end of the complex neural network is connected to an input end of the predistortion multiplier, an output end of the predistortion multiplier is connected to an input end of the radio frequency power amplifier output feedback circuit, an output end of the radio frequency power amplifier output feedback circuit is an output end of the predistortion system, the method comprising:

outputting a complex scalar corresponding to the training complex vector based on an inputted training complex vector, initializing a system parameter of the predistortion system;

inputting complex vectors in the training set to the predistortion system in accordance with element indexes, wherein a size of a complex vector which is input each time is determined based on a power amplifier memory effect parameter of the predistortion system, and a complex vector which is input to the predistortion system each time is obtained by combining a history element value and a current element in the training set;

inputting an output of the radio frequency power amplifier output feedback circuit in the predistortion system to the complex neural network after passing it through a second real-time power normalization unit further comprised in the predistortion system;

or inputting an output of the radio frequency power amplifier output feedback circuit in the predistortion system directly to the complex neural network;

determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network;

updating, according to the determined partial derivatives or sensitivities for each layer within the complex neural network, the weight parameter and the bias parameter of the each layer;

testing the predistortion system based on a test set to obtain a generalization error vector magnitude and a generalization adjacent channel leakage ratio corresponding to the predistortion system;

completing training of the predistortion system in response to values corresponding to the generalization error vector magnitude and the generalization adjacent channel leakage ratio being greater than or equal to their respective set thresholds, and continuing the training of the trained predistortion system based on the training set in response to the values corresponding to the generalization error vector magnitude and the generalization adjacent channel leakage ratio being less than their respective set thresholds; and inputting a service complex vector to the trained predistortion system to obtain a predistortion corrected complex scalar;

wherein the training set and the test set are obtained based on splitting of a normalized complex vector, the normalized complex vector being an output of a first real-time power normalization unit further comprised in the predistortion system which is obtained by inputting the training complex vector to the first real-time power normalization unit; or the training set and the test set are obtained based on splitting of the training complex vector wherein an expression of a complex vector which is input to the predistortion system each time is as follows:

$$\vec{X}_1^{Train} = [x_1^{Train}(n-M_1), \ldots, x_1^{Train}(n-m), \ldots x_1^{Train}(n-1), x_1^{Train}(n)],$$

wherein $\vec{X}_1^{Train}$ is the complex vector which is input to the predistortion system each time, $M_1$ is the power amplifier memory effect parameter, $0 \leq M_1 \leq \text{TrainSize}$, TrainSize is a size of the training set, $x_1^{Train}(n)$ is an nth element in the training set, $x_1^{Train}(n)$ is the current element, m is an integer greater than 1 and less than $M_1$, $x_1^{Train}(n-1)$, $x_1^{Train}(n-m)$ and $x_1^{Train}(n-M_1)$ are an (n−1)th element, an (n−m)th element, and an (n−$M_1$)th element in the training set, respectively, and $x_1^{Train}(n-1)$, $x_1^{Train}(n-m)$ and $x_1^{Train}(n-M_1)$ are all history elements.

18. A non-transitory computer-readable storage medium storing a computer program which, when executed by a processor, causes the processor to implement a predistortion method of performed by a predistortion system which comprises a predistortion multiplier, a complex neural network, and a radio frequency power amplifier output feedback circuit, wherein an output end of the complex neural network is connected to an input end of the predistortion multiplier, an output end of the predistortion multiplier is connected to an input end of the radio frequency power amplifier output feedback circuit, an output end of the radio frequency power amplifier output feedback circuit is an output end of the predistortion system, the method comprising:

outputting a complex scalar corresponding to the training complex vector based on an inputted training complex vector;

initializing a system parameter of the predistortion system;

inputting complex vectors in the training set to the predistortion system in accordance with element indexes, wherein a size of a complex vector which is input each time is determined based on a power amplifier memory effect parameter of the predistortion system, and a complex vector which is input to the predistortion system each time is obtained by combining a history element value and a current element in the training set;

inputting an output of the radio frequency power amplifier output feedback circuit in the predistortion system to the complex neural network after passing it through a second real-time power normalization unit further comprised in the predistortion system;

or inputting an output of the radio frequency power amplifier output feedback circuit in the predistortion system directly to the complex neural network;

determining, according to a partial derivative or sensitivity of a loss function of the complex neural network in the predistortion system with respect to each element in a correction vector which is output by the complex neural network, partial derivatives or sensitivities of the loss function with respect to a weight parameter and a bias parameter of each layer within the complex neural network;

updating, according to the determined partial derivatives or sensitivities for each layer within the complex neural network, the weight parameter and the bias parameter of the each layer;

testing the predistortion system based on a test set to obtain a generalization error vector magnitude and a generalization adjacent channel leakage ratio corresponding to the predistortion system;

completing training of the predistortion system in response to values corresponding to the generalization error vector magnitude and the generalization adjacent channel leakage ratio being greater than or equal to their respective set thresholds, and continuing the training of the trained predistortion system based on the training set in response to the values corresponding to the generalization error vector magnitude and the generalization adjacent channel leakage ratio being less than their respective set thresholds; and inputting a service complex vector to the trained predistortion system to obtain a predistortion corrected complex scalar;

wherein the training set and the test set are obtained based on splitting of a normalized complex vector, the normalized complex vector being an output of a first real-time power normalization unit further comprised in the predistortion system which is obtained by inputting the training complex vector to the first real-time power normalization unit; or the training set and the test set are obtained based on splitting of the training complex vector wherein an expression of a complex vector which is input to the predistortion system each time is as follows:

$$\vec{X}_1^{Train} = [x_1^{Train}(n-M_1), \ldots, x_1^{Train}(n-m), \ldots, x_1^{Train}(n-1), x_1^{Train}(n)],$$

wherein $\vec{X}_1^{Train}$ is the complex vector which is input to the predistortion system each time, $M_1$ is the power amplifier memory effect parameter, $0 \leq M_1 \leq TrainSize$, TrainSize is a size of the training set, $x_1^{Train}(n)$ is an nth element in the training set, $x_1^{Train}(n)$ is the current element, m is an integer greater than 1 and less than $M_1$, $x_1^{Train}(n-1)$, $x_1^{Train}(n-m)$ and $x_1^{Train}(n-M_1)$ are an (n−1)th element, an (n−m)th element, and an (n−$M_1$)th element in the training set, respectively, and $x_1^{Train}(n-1)$, $x_1^{Train}(n-m)$ and $x_1^{Train}(n-M_1)$ are all history elements.

* * * * *